(12) United States Patent
Fathi

(10) Patent No.: US 9,273,718 B2
(45) Date of Patent: Mar. 1, 2016

(54) ROTARY JOINT ASSEMBLY AND COMBINATION CLIP-HOOK AND JEWELRY PIECE EMPLOYING THE SAME

(71) Applicant: Clipsy, LLC, Henderson, NV (US)

(72) Inventor: Farvardin Fathi, Henderson, NV (US)

(73) Assignee: Clipsy, Inc., Henderson, NV (US)

( * ) Notice: Subject to any disclaimer, the term of this patent is extended or adjusted under 35 U.S.C. 154(b) by 22 days.

(21) Appl. No.: 13/834,177

(22) Filed: Mar. 15, 2013

(65) Prior Publication Data

US 2013/0277524 A1   Oct. 24, 2013

Related U.S. Application Data

(63) Continuation-in-part of application No. 13/448,946, filed on Apr. 17, 2012, which is a continuation-in-part of application No. 12/568,663, filed on Sep. 28, 2009, now Pat. No. 8,162,276.

(60) Provisional application No. 61/101,104, filed on Sep. 29, 2008.

(51) Int. Cl.
*F16B 45/02* (2006.01)
*F16B 45/06* (2006.01)
*A44B 15/00* (2006.01)
*A47G 29/08* (2006.01)

(52) U.S. Cl.
CPC .............. *F16B 45/02* (2013.01); *A44B 15/005* (2013.01); *A47G 29/083* (2013.01); *F16B 45/06* (2013.01)

(58) Field of Classification Search
CPC .......... F16B 45/00; F16B 45/02; F16B 45/06; A47G 29/083; A47G 25/0607; A47G 1/20; B60R 7/10; A44B 15/005

USPC .............. 248/914, 309.1, 315, 316.1, 316.5, 248/316.7, 690, 691, 692, 304, 305, 306, 248/339, 220.21, 220.31; 223/120, 94, 91, 223/85, DIG. 4

See application file for complete search history.

(56) References Cited

U.S. PATENT DOCUMENTS

| 252,441 | A | * | 1/1882 | Edge | ................................. 63/10 |
| 449,103 | A | | 3/1891 | Bachem | |
| 477,270 | A | * | 6/1892 | Roos | ............................. 248/308 |
| 808,322 | A | | 12/1905 | Wallenthin | |

(Continued)

FOREIGN PATENT DOCUMENTS

| DE | 7908460 | 7/1979 |
| JP | 03086508 U | 4/1991 |
| KR | 1020110128100 A | 11/2011 |

*Primary Examiner* — Nkeisha Smith
(74) *Attorney, Agent, or Firm* — Loginov & Associates, PLLC; William A. Loginov

(57) ABSTRACT

This invention provides a combination clip and hook (clip) for use generally in suspending articles having shoulder or hand straps, or carrying other accessories, such as keys, which is rotatably movable about a rotary joint between a first position in which two opposing, rotatably joined portions of the overall clip structure are oriented together to form a continuous, enclosed shape that can be secured around another strap or loop on an item or piece of clothing, and a second position in which the two portions of the structure are rotated out of the enclosed shape, and into, for example, a substantially S-shaped hook in which one portion of the structure supports the strap of the item and the other portion can be applied to a clothing hook, chair back, table surface, door top, or other supporting member.

18 Claims, 27 Drawing Sheets

(56) References Cited

U.S. PATENT DOCUMENTS

| | | | |
|---|---|---|---|
| 813,755 A | 2/1906 | Wallenthin | |
| 843,195 A | 2/1907 | Crain | |
| 843,243 A | 2/1907 | Wallenthin | |
| 1,132,414 A | 3/1915 | White | |
| 2,555,890 A | 6/1949 | Korth | |
| D159,834 S | 8/1950 | Meyers | |
| 2,692,108 A | 10/1954 | Neivert | |
| 2,842,822 A | 10/1955 | Bennett | |
| 2,997,182 A | 6/1960 | Lewis et al. | |
| D196,852 S | 11/1963 | Oldak | |
| 3,630,475 A | 12/1971 | Barry | |
| D229,870 S | 1/1974 | Czarny | |
| 3,860,210 A | 1/1975 | Berardinelli et al. | |
| D240,990 S | 8/1976 | Bernstein | |
| D244,910 S | 7/1977 | Chasen et al. | |
| D250,003 S | 10/1978 | Thomasson | |
| 4,118,001 A * | 10/1978 | Serkez | 248/308 |
| 4,194,714 A * | 3/1980 | Schultz | 248/308 |
| 4,210,302 A * | 7/1980 | Serkez | 248/308 |
| D271,385 S | 11/1983 | Novak | |
| 4,792,253 A | 12/1988 | Jacobson | |
| D314,864 S | 2/1991 | Creed | |
| 5,094,417 A | 3/1992 | Creed | |
| D382,829 S * | 8/1997 | Hoffman | D11/5 |
| D447,932 S | 9/2001 | Kelleghan | |
| 6,530,548 B2 | 3/2003 | Pizzirusso | |
| D489,249 S | 5/2004 | Moore | |
| D515,450 S | 2/2006 | Schiesl-Griesinger | |
| D542,171 S | 5/2007 | Olson | |
| D550,113 S | 9/2007 | Osterbaek | |
| 7,360,962 B2 | 4/2008 | To | |
| D569,714 S | 5/2008 | Stewart et al. | |
| 8,083,202 B1 * | 12/2011 | Hutchison | 248/691 |
| 2003/0038220 A1 * | 2/2003 | Catan | 248/304 |
| 2004/0181918 A1 | 9/2004 | Croteau | |
| 2005/0161570 A1 | 7/2005 | Bauerly | |
| 2006/0108496 A1 | 5/2006 | Miranda | |
| 2008/0042032 A1 | 2/2008 | Yap et al. | |
| 2009/0294491 A1 | 12/2009 | Carver | |
| 2011/0010903 A1 * | 1/2011 | Starbuck | 24/716 |

\* cited by examiner

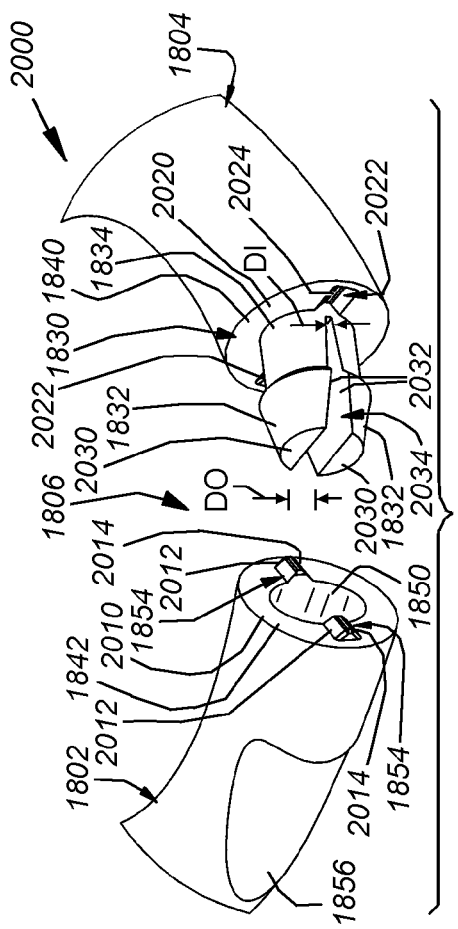
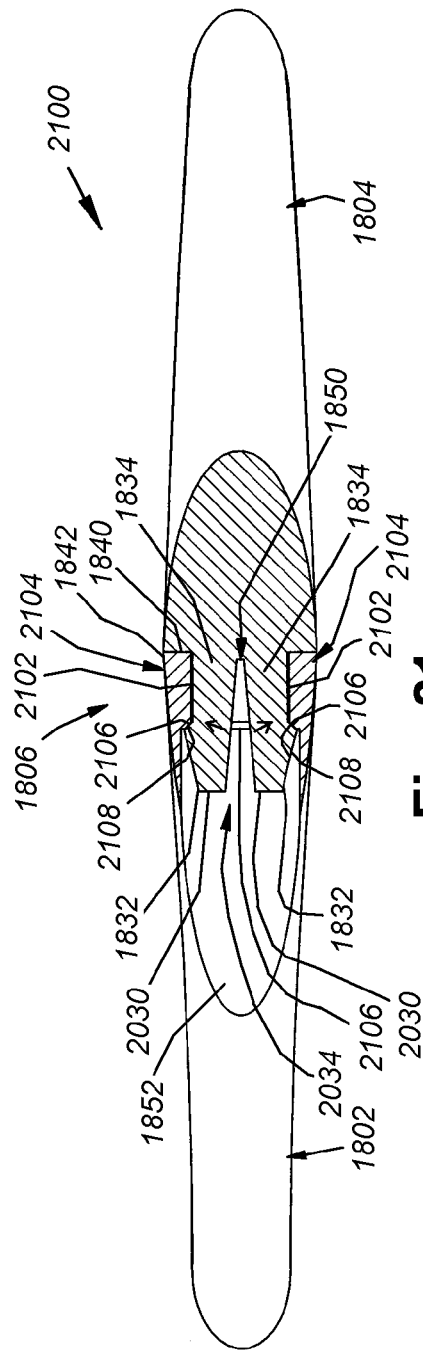
Fig. 20
Fig. 21

ROTARY JOINT ASSEMBLY AND COMBINATION CLIP-HOOK AND JEWELRY PIECE EMPLOYING THE SAME

RELATED APPLICATION

This application is a continuation-in-part of co-pending U.S. patent application Ser. No. 13/448,946, filed Apr. 17, 2012, entitled ROTARY JOINT ASSEMBLY AND COMBINATION CLIP-HOOK AND JEWELRY PIECE EMPLOYING THE SAME, by Farvardin Fathi, et al, which is a continuation-in-part of U.S. patent application Ser. No. 12/568,663, filed Sep. 28, 2009, entitled ROTARY JOINT ASSEMBLY AND COMBINATION CLIP-HOOK AND JEWELRY PIECE EMPLOYING THE SAME, by Farvardin Fathi, et al., now U.S. Pat. No. 8,162,276, issued Apr. 24, 2012, which claims the benefit of U.S. Provisional Application Ser. No. 61/101,104, entitled COMBINATION CLIP AND HOOK FOR PURSES, BAGS AND ACCESSORIES, by Farvardin Fathi (as Farvardin Fathi Kamangar), et al., filed Sep. 29, 2008, the teachings of which are expressly incorporated herein by reference.

FIELD OF THE INVENTION

This invention relates to detachable accessories for use with purses, bags and other items having a carrying handle or strap, and more particularly to hanging hooks for bags, and the like as well as other accessories that employ a movable joint to change orientations of components thereof.

BACKGROUND OF THE INVENTION

Hooks and clips are commonly used items in daily life. They allow items to be secured together when desired. They also allow items to be hung from a suspended surface to as to avoid placing the item on a dirty floor or other surface. It is particularly desired to elevate purses, bags, and other hand-and-shoulder-carried effects above the floor or other surface. This is because such items can contain valuable contents, and may be constructed from expensive materials that are prone to soiling. In addition, it is desired to maintain such items and effects at or near eye level so that they can be closely monitored against theft. One particular scenario in which the elevation of a purse, bag or other effect is particularly desirable is when the owner is seated at a restaurant or pub. While coat hooks or other hardware used to suspending garments may be available, the owner usually prefers to maintain the bag or purse in close proximity to his or her person. Options for doing so are often limited. The bag or purse can be placed beneath the owners legs, rendering it subject to soiling and spilled liquid. Alternatively, it can be placed on the table or countertop, where it becomes intrusive and may also be subject to soiling from spilled liquid and food.

More generally, a variety of accessories benefit from a closure structure. For example, solid bracelets, solid necklaces, and the like desirably allow for an opened orientation that enables attachment and removal, as well as a closed position that secures them to the wearer. Typically, this entails delicate hinges and cumbersome clasps, many of which are prone to breakage and otherwise difficult to manipulate.

Accordingly, it is desirable to provide a mechanism that allows for the suspension of a purse, bag or other hand/shoulder-carried item at virtually any convenient supporting location. The mechanism should be easily carried when not in use, sufficiently sturdy so as not to break under normal conditions, and should have a pleasing appearance. Variations of the basic mechanism should also be capable of performing other functions, and carried for other purposes in addition to the suspension of bags and hand/shoulder-carried items, such as bracelets and closable jewelry. The mechanism should also generally allow for integrated closure and locking to simply use. In addition, the mechanism should enable the overall structure to be constructed from a variety of materials including, but not limited to metals, polymers, and the like.

SUMMARY OF THE INVENTION

This invention overcomes the disadvantages of the prior art by providing a combination clip and hook (clip) or other closable assembly for use generally in suspending articles having shoulder or hand straps, or otherwise carrying accessory items, such as keys, which is rotatably movable about a rotary joint between a first rotational position in which two opposing, rotatably joined portions of the overall clip structure are oriented together to form a continuous, enclosed shape that can be secured around another strap or loop on an item or piece of clothing (e.g. a belt loop), and a second rotational position in which the two portions of the structure are rotated out of the enclosed shape, and into a hook (for example, an S-shaped hook) in which one portion of the structure supports the strap of the item and the other portion can be applied to a clothing hook, chair back, table surface, door top, or other supporting member. In further embodiments, the enclosed structure can define a wearable piece of jewelry that is secured to the wearer's wrist, ankle, neck or other appendage in the enclosed orientation and removable therefrom in the opened orientation. In an illustrative embodiment, the joint between the two portions can define a spring-loaded rotating pivot assembly with at least two indexing positions. The first index position places the portions in the enclosed orientation, with opposing free ends thereof (opposite the joint ends) being in a confronting relationship with a minimal gap therebetween. The second index position orients the two portions approximately 180 degrees opposite the enclosed orientation, thereby allowing the formation of the hook.

In an illustrative embodiment, the rotary joint can be constructed with a pair of confronting male wedge/projection surfaces and female groove/detent surfaces, constructed as inserts that are normally biased toward each other by an embedded spring assembly, all of which is disposed on an axle. The spring assembly can comprise a series of Belleville washers arranged in a stack about the axle shaft. The axle shaft can comprise a machine screw that passes through concentric cylindrical holes the joint ends in both portions, and is threadingly secured into one side of the joint. Alternatively the axle can be a shaft with an enlarged head on one end, and a removable clip on the opposing end. The Belleville washers in this embodiment can be located adjacent both sides of the axle. The opposing ends of the joint, on each portion, may be covered with conforming plugs having an outer cap surface that is shaped to provide a continuous outer surface with respect to the adjacent clip surface. A pair of resilient tips can be mounted on each of the opposing free ends of each portion, adjacent to the confronting gap therebetween. These tips can be shaped so as to provide an additional hook end and a frictional surface when one side or the other of the hook is applied to a supporting member, and can project inwardly from each respective end to define an extended hook end.

Further, in an illustrative embodiment, the male joint insert can comprise include a plurality of male wedge structures, and the insert can be secured into a circular receiving recess on one of the portions with interengaging flats that prevent rotation of the male insert with respect to the portion. The opposing insert can comprise a hollowed back end that is also formed with flats which engage corresponding flats on a raised surface of the opposing portion. Both inserts are fully seated in the circular recess in this embodiment. In this manner, each of the inserts is prevented from rotation with respect to its portion but each can rotate with respect to the other. Thus, when one portion rotates with respect to the other detent insert, the underlying insert rotates with it. The male insert includes two projecting wedges or domes and the female detent insert consists of two corresponding grooves or wells. By providing a predetermined rotational force, the spring biasing force applied between the inserts is overcome, and the male wedges are allowed to pass out of the female grooves. When a desired position (either the enclosed or hook orientation) is attained, the wedges click into engagement with the grooves to maintain that position against casual rotation.

In one embodiment, the enclosed orientation of the clip can define a heart, or another pleasing geometric shape, and the joined portions can comprise mirror-image halves of the shape. In a further embodiment, the interior edge of one or both portions can define a mirror-image halves of a polygonal inner and outer perimeter outline that includes a useful tool or accessory, such as a bottle opener, or a useful enclosing shape, such as a napkin holder. Other shapes, such as a circle, oval or the like are also contemplated—essentially any shape that produces an enclosure in one rotational orientation and a hook in an opposed orientation (each opposed rotational orientation lying typically in a common plane). In further embodiments, the size of the inner perimeter of the accessory is highly variable and can be sided to fit around only smaller items, such as a jewelry chain, belt loop, or the like. The clip in this smaller scale (or larger-scale) version can be fitted with one or more accessory structures. For example, a key chain assembly or a computer memory stick. The accessory structure(s) can be mounted on the edge of one of the clip portions, and located so that the attached accessories are balanced when the opposing portion is hung upon a supporting surface. The surface cross-section of the clip structure portions in any embodiment herein can vary, and the surface can have a variety of ornamental designs formed thereon.

In other embodiments, the first portion and second portion of the rotationally hinged overall structure can be formed in whole, or in part from a polymer material. A unitary (commonly molded) joint assembly can be employed in this embodiment. Such a joint is easy to assemble with reduced number of parts. In an embodiment, the joint of this unitary structure includes a first index surface having male projections and a second index surface having female detents. The joint further defines a unitary prong assembly and a mating unitary recess on each of the first portion and the second portion, respectively. The recess and the prong are closely fitted mating cylinders with conforming conical ends that facilitate restriction of axial movement, while allowing axial rotation once the prong assembly is fully seated in the recess. The recess includes a first inclined surface and the prong assembly includes at least two spaced apart prongs each having a second inclined surface confronting the first inclined surface. In this manner, rotation of the first portion with respect to the second portion causes axial tension therebetween as the male projections ride out of the detents and along the adjacent surface. This is movably resisted in an axial direction by flexure of the prongs toward each other as the second inclined surface is drawn over the first inclined surface. The axial tension draws the index surfaces together at the joint when the portions are completely rotated to a new orientation in which the male projections are again seated in detents. The polymer material can be coated with a variety of materials that provide a variety of surface finishes, including, but not limited to sculpted surfaces and metalized finishes.

In a further illustrative embodiment similar to the above-described unitary, prong-carrying structure, a clip and loop structure is provided with a first portion and a second portion that are rotatably joined so as to selectively move between two rotary index positions including an open, hook position and a closed, loop position. The first portion illustratively comprises a polymer piece with a unitary prong assembly at the joint end, and defines a partial loop. The second portion comprises a metal piece with a joint end that includes a recess that receives the prong assembly, and also defines a partial loop. The recess in the second portion is illustratively formed as a separate member that is inserted into a socket in the joint end of the metal piece. An elastomeric pad is provided to the free end of the first portion (the polymer piece) opposite a joint end thereof in a location that engages a table of other supporting surface when the structure is rotated to the open position to define a hook. The recess and the prong assembly are closely fitted mating cylinders with conforming conical ends that restrict axial movement of the first portion and the second portion, while allowing axial rotation once the prong assembly is fully seated in the recess (after assembly). The prong assembly includes at least two spaced-apart prongs each having an inclined surface that enables the prongs to flex inwardly toward each other as they are driven into the cylindrical recess during assembly. Once assembled, the rear face of each of the prongs engages an inner circumferential wall of the recess and thereby resists axial pullout. The semi-cylindrical shaft of each of the prongs includes an axially aligned, external protrusion at each located at approximately 180 degrees with respect to the other. These protrusions movably mate with corresponding indentations along the cylindrical inner wall of the recess at each at a 180-degree circumferential spacing with respect to the other. The protrusions and indentations are positioned to allow the joint to rotatably index between the open position and the closed position. In an embodiment, the free end of the second portion overlaps and overlies the free end of the first portion in the closed, loop position.

In yet another illustrative embodiment, the clip and loop structure (or other closable jewelry piece with an indexed opened and closed position), is provided with each of the first portion and the second portion thereof joined at a rotary joint, the first and second portion each defining a first perimeter shape wherein the first portion and the second portion define an enclosed orientation with the free ends of each of the first and second portion overlapping and a second perimeter shape that is an open orientation with the first portion rotationally remote (approximately 180 degrees with respect to each other) from the second portion. In the enclosed orientation, the clip and loop structure defines a loop. In the open orientation, the clip and loop structure define a hook. The index assembly in the joint assembly includes a pair of opposing grooves on the first portion and at least one indicator on the second portion having a projection for selectively engaging each of the grooves in each of the first rotational position and the second rotational position. The indicator is mounted in an indicator pocket in the second portion and confronts the grooves. The joint assembly includes an axle bolt that passes through each of the first and second portion and is fixedly attached to the first portion or the second portion, the axle bolt being threadingly seated into a retaining nut embedded in the first or second portion. At least one of the first portion and the second portion is comprised of a polymer and the retaining nut can be embedded in a polymer region thereof and that nut can be comprised of a metal. The first or second portion can have a recess for the axle bolt and a cap to cover that recess conforms to the geometry of the relevant portion. The recess includes a spring support that is constructed and arranged to engage and rotate with respect to a face of the nut about the axle bolt. The spring assembly is comprised od a plurality of Belleville washers oriented in an opposed relationship that bias the first portion against the second portion. At least one of the free ends of the two portions is provided with a resilient pad. The first and second portion are constructed and arranged to define a solid piece of jewelry in the closed position and can be removed in the open position. The clip and loop structure can enclose a strap for a hand-carried bag in the closed position.

BRIEF DESCRIPTION OF THE DRAWINGS

The invention description below refers to the accompanying drawings, of which:

FIG. 20 is a fragmentary perspective view of the rotary joint region of the clip and hook structure of FIG. 18 further detailing the operative components of the rotary joint;

FIG. 21 is a cross section of the clip and hook structure of FIG. 18 taken along line 21-21 of FIG. 18;

DETAILED DESCRIPTION

Figure 1:
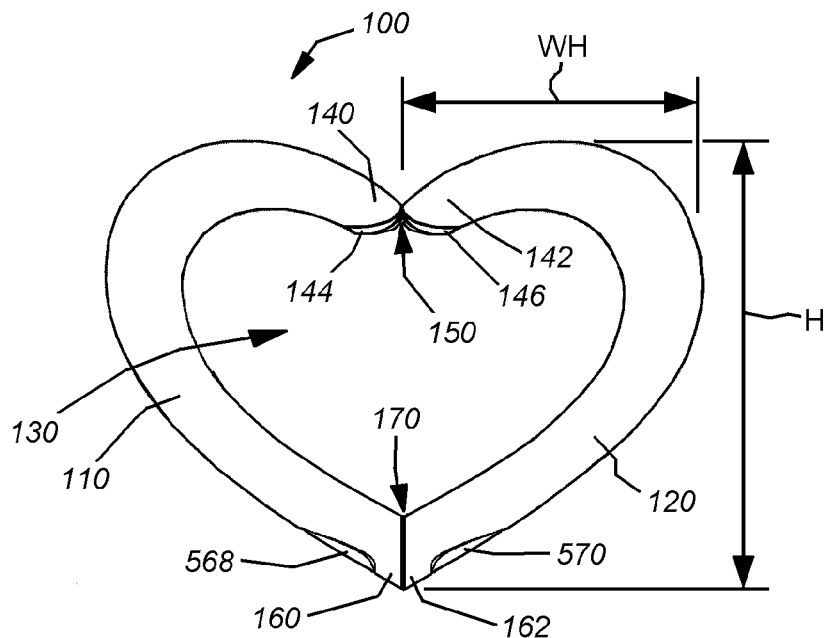
FIG. 1 is a side view of a combination clip and hook (clip) structure according to an embodiment of this invention detailing a heart-shaped outline.

FIG. 1 shows a clip and hook structure 100 in side view according to an illustrative embodiment of this invention. Notably, the clip and hook structure 100 (also termed herein the "clip") consists of a pair of portions 110 and 120—each defining a substantial mirror image of the other's outline perimeter shape. Each portion 110, 120 in this embodiment forms one half of an overall heart-shaped outline in this embodiment. Each clip portion 110, 120 defines a maximum width WH of approximately 50-60 mm in this embodiment and a height H of approximately 70-90 mm in this embodiment. Of course, the actual width and height are highly variable in alternate embodiments. In general, the chosen width and height provides an interior region 130 when enclosed as shown that is sufficient to clear a handle, shoulder strap, or other carrying member of a bag, luggage piece or other hand/shoulder-carried item. The width WH also allows for a hook shape (as described below) that is sufficiently large to engage a variety of supporting surfaces.

The upper (free) ends 140 and 142 of each portion 110 and 120 includes a resilient insert 144 and 146. The insert can be secured by a slot or keyway formed within each end 140 and 142, respectively. The body of each portion 110 and 120 can be constructed from a variety of materials with a variety of surface finishes. In one embodiment, the portions 110 and 120 are constructed from stainless steel with a matte or shiny finish. In alternate embodiments, the portions 110 and 120 can be hollow, in whole or in part. Alternatively, a durable plastic or other material can be employed, provided that is provides sufficient holding strength to perform the functions described herein. When formed from a metal, conventional casting techniques can be employed in one embodiment. The upper/free ends 140 and 142 have defined therebetween a small gap 150. The ends are unjoined with respect to each other and free of any clasps or other mechanisms in this embodiment. In alternate embodiments, as described below, a clasp or locking mechanism can be provided to secure the free ends together against inadvertent rotation out of the enclosed orientation.

Figure 2:
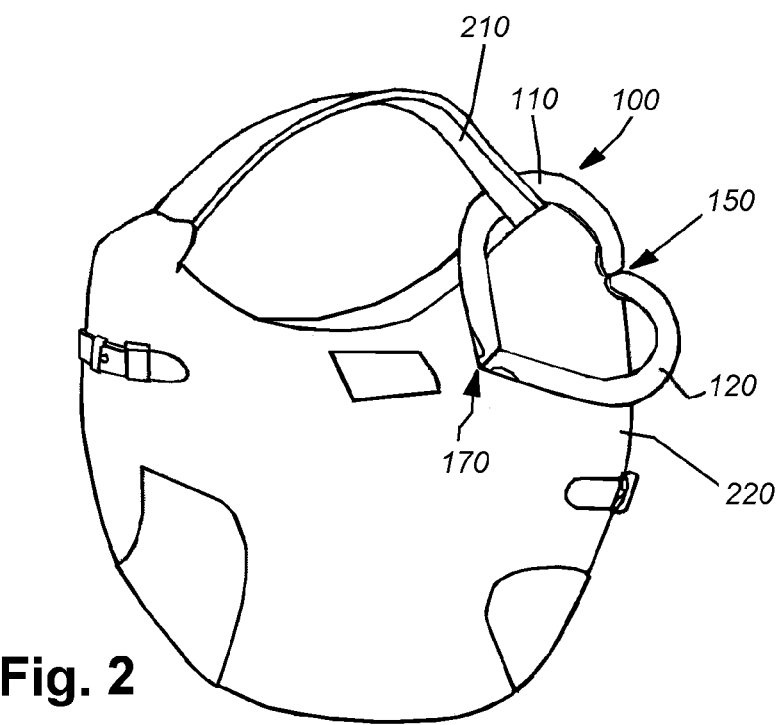
FIG. 2 is a perspective view of the clip structure of FIG. 1 shown secured to the handle strap of an exemplary handbag.

As shown in FIG. 2, the clip 100 can be carried in the enclosed orientation (as shown in FIG. 1) around the carry handle 210 of a conventional handbag 220. In this orientation, it is relatively unobtrusive, and provides a decorative accent to the bag 220. In alternate arrangements, the clip 100 can be carried on a belt loop, shoulder strap or any other enclosed or strap structure that generally prevents the clip from detaching inadvertently. The gap 150 is sufficiently narrow (for example a few millimeters or less) to prevent the handle 210 or another carrying member from passing therebetween.

Referring again to FIG. 1, the opposing ends 160 and 162 of portions 110 and 120, respectively, are joined by a rotary joint 170 and embedded index assembly according to an embodiment of this invention. This index assembly will be described in further detail below. In general, the index assembly allows the portions to be maintained in the enclosed orientation as shown in FIG. 1, or with the application a suitable degree or rotational torque, rotated to a 180 degree position to form an S-shaped hook.

Figure 3:
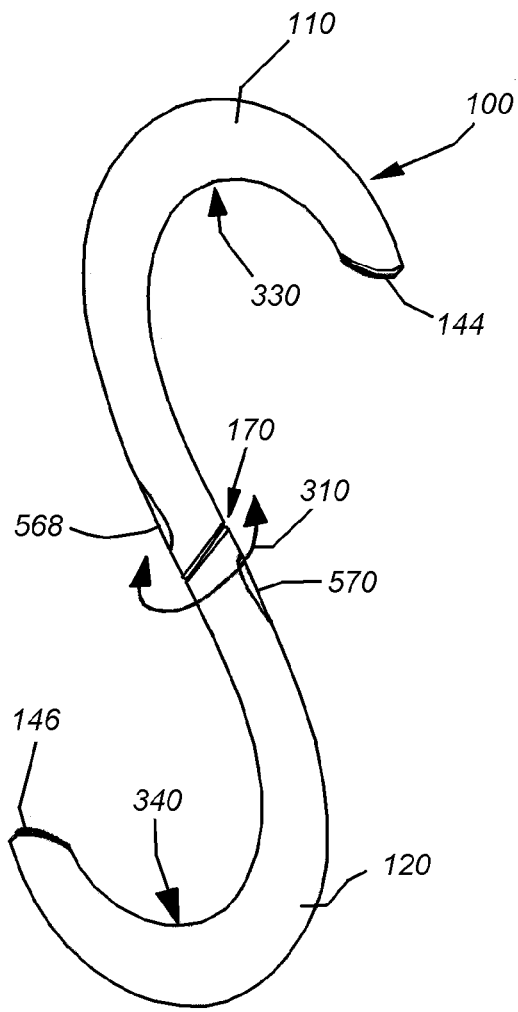
FIG. 3 is a side view of the clip structure of FIG. 1 deployed into an S-shaped hook orientation.

With reference now to FIG. 3, the portions 110, 120 of the clip 100 have been rotated (double-curved arrow 310) 180-degrees about the rotary joint 170 from the enclosed heart-shaped orientation of FIG. 1 into an S-shape hook orientation. The resulting hook shows the upper portion 110 defining an inner perimeter 330 having an upward arch that ends in the resilient tip 144. This upper arch 330 allows the upper end to be hooked upon any acceptable supporting surface, such as a clothing hook, clothing hanger, chair back, door or bathroom stall top, wall peg/nail, or table/counter top without sliding free. The lower end of the hook, represented by portion 120, includes an inner perimeter 340 that projects below the tip 146. The inner perimeter 340 thereby provides a lower hook arch that can engage any acceptable carrying handle or other loop-like structure—and prevent that carrying handle/strap from sliding off. Likewise, the projecting resilient tips define an extended hook end that aids in securing the hook around a given supporting surface.

Figure 4:
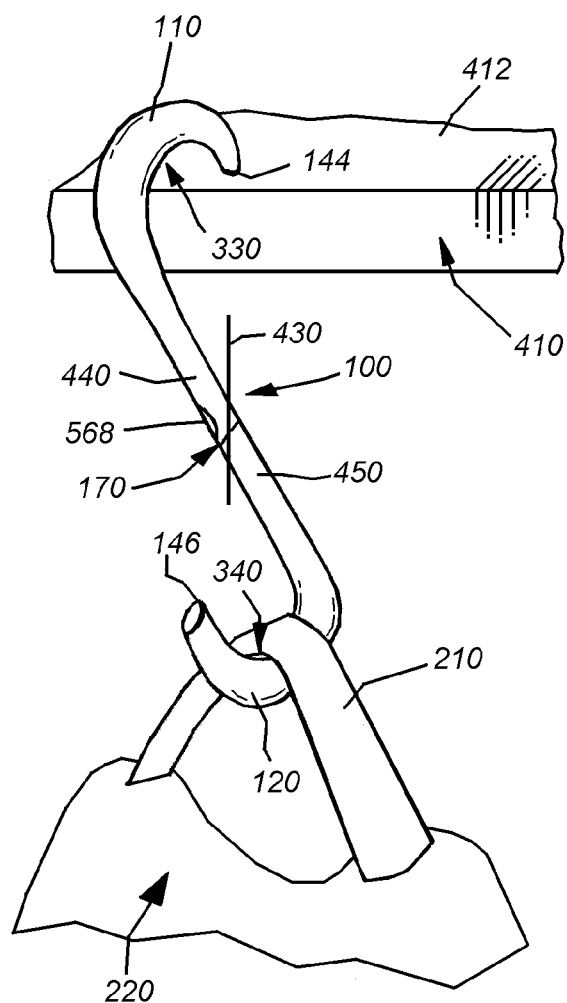
FIG. 4 is a perspective view of the clip deployed in the S-shaped hook orientation as shown in FIG. 3 supporting the exemplary handbag with respect to a table top support.

Thus, according FIG. 4, when the clip 100 is rotated into the S-shaped hook orientation of FIG. 3 it can support the depicted carry handle 210 of the bag 220 at its lower hook end (portion 120), while the upper hook end (portion 110) engages the edge 410 of a table top 412 with the frictional tip 144 in engagement against the top 412. The hook securely maintains the bag with respect to the table top, in part, because the apex of each inner perimeter loop 330, 340, resides in a vertical line 430 with respect to gravity. Note that the portions 440 and 450 of the portions 110 and 120, adjacent to the rotary joint 170, extend approximately along a line that passes at complimentary acute angles with respect to the vertical line 430. This arrangement allows the opposing inner perimeter hoops 210 and 220 to overlie each other in the vertical as shown. Thus, the bag maintains a proper balance beneath the table edge, while the hook remains in balanced engagement with the table top. Note that in various embodiments described herein the two portions of the clip remain substantially in a common plane in the two opposed orientations (enclosed and open/S-hook) to aid in maintaining balance. In alternate embodiments, the two (or more) portions can be formed with a more complex three-dimensional shape that deviates from a common plane, but still allows a substantially enclosed orientation as well and a hook that effectively balances items depending therefrom with respect to a supporting surface.

It should be clear that the upper hook end (portion 110) of the clip can be secured to any acceptable supporting member while securely carrying the bag or another effect therebelow. Such supporting members can include, but are not limited to clothing hangers, coat hooks and pegs, chair backs, handlebars, automotive hand grips and door knobs. Note also that, in alternate embodiments, the portions can be divided asymmetrically on the overall shape and/o the overall shape can be asymmetrical. Thus the term "portion" or "portions" should be taken broadly to include any division of the overall geometric shape of the clip with respect to the rotary joint. Furthermore, additional joints can be provided to create three or more portions of the overall clip, each allowing the clips shape to morph into a plurality of different arrangements.

Figure 5:
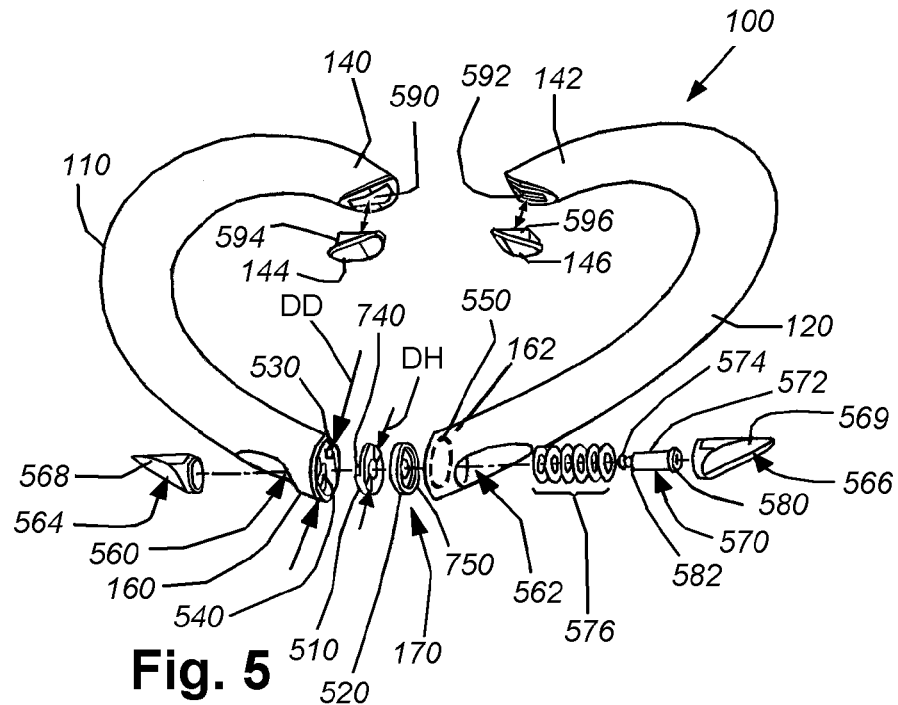
FIG. 5 is an exploded view of the clip structure of FIG. 1 detailing the rotary joint assembly according to an illustrative embodiment of this invention.
Figure 6:
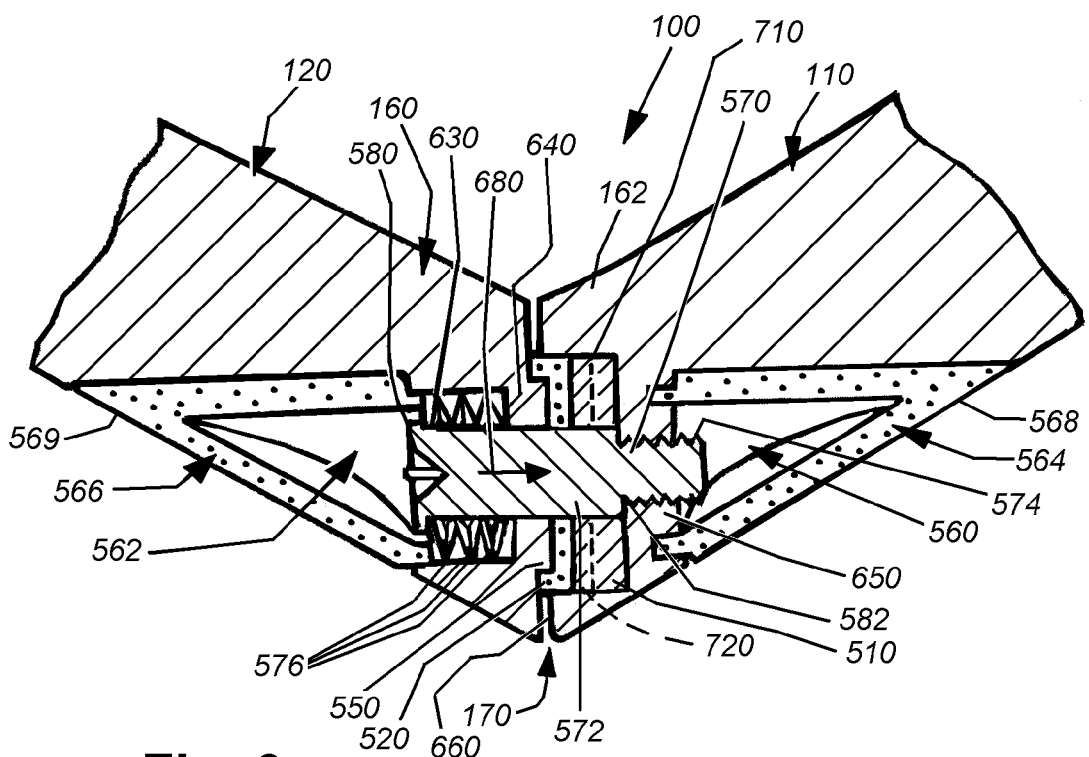
FIG. 6 is a partial cross-section of the assembled rotary joint assembly of the clip structure of FIG. 1.
Figure 7:
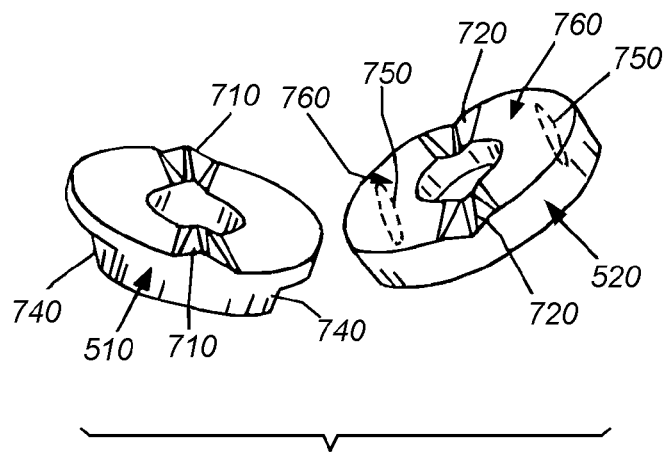
FIG. 7 is a perspective view of the male and female joint inserts for use in the rotary joint of the clip structure of FIG. 1.

Reference is now made to FIGS. 5-7 that show the index assembly of the rotary hinge 170 in further detail. As discussed above, the rotary joint 170 provides two diametrically opposed (180-degree) locking positions, each of which can be selected by application by the user of a suitable level of rotational torque between the portions 110, 120 at the rotary joint 170. One locking position produces the enclosed orientation as shown in FIG. 1 and the other locking position produces the illustrative S-shaped hook orientation as shown in FIG. 3. The opposing joint ends 160 and 162 of respective portions 110 and 120 are adapted to secure each of a pair of index inserts 510 and 520. The inserts 510 and 520 are adapted to interengage with each other. The insert 510 includes a pair of radially disposed male wedges (projections) 710 the opposing insert 520 includes a pair of confronting female grooves (detents) 720. In this embodiment, the joint end 160 includes a cylindrical recess or orifice 530 of sufficient depth to house both of the inserts 510 and 520 in a stacked arrangement. The inner diameter DD of the recess 530 is approximately 8-9 millimeters in this embodiment. The outer diameter DI of each index insert 510, 520 is equal to, or less than, the recess diameter DD so that the inserts 510 and 520 can be nested within the recess 530 with little lateral/radial play. The male/wedge insert 510 includes a pair or rearwardly projecting flattened sides 740 that are adapted to engage interior flats/shoulders 540 within the recess 530. Likewise, the opposing joint end 162 includes a slightly raised base 550 that includes flats adapted to engage corresponding flats 750 (shown in phantom in FIG. 7) within a hollow rear of the female/groove insert 520. The insert flats 740 and 750, in engagement with respective ends 160 and 162, thereby restrict rotation or the inserts 510 and 520 (respectively) relative to their portions 110 and 120. Thus, when the portion 110 is rotated about the joint 170 by a user with respect to the portion 120, the inserts 510 and 520 are likewise rotated with respect to each other.

As shown, the projections or wedges 710 and conforming detents or grooves 720 respectively project outwardly and inwardly approximately 0.3-0.4 millimeters. The overall depth of each insert is between approximately 1 and 3 millimeters. This dimension is highly variable. The inserts 510, 520 are constructed from a durable material that can reduce friction and wear generated by the rubbing of the wedges 710 against the surface of the female/groove insert 520 and the female insert's outer surface against the metallic surface of the recess 530. The material can be a high performance polymer such as polyoxymethylene (POM). Other materials are expressly contemplated. As shown in FIG. 7, the wedges 710 and grooves or detents 720 flare radially outwardly. A variety of geometries can be used in alternate embodiments. In alternate embodiments, rather than exhibiting the depicted chiseled shape, the male and female index elements can be rounded over (see FIG. 8, for example).

The exterior walls of each portion 110 and 120 adjacent to the ends 160 and 162 define a pair of concentric pockets 560 and 562, respectively each facing outwardly. The pockets 560, 562 provide for through-holes through which the spring and axle assembly of the joint can be inserted. In this embodiment, the joint's axle is a machined screw 570 having an elongate cylindrical barrel section 572 and a threaded end 574 of smaller diameter. A series of cup-like Belleville steel washers 576 provide the spring assembly in this embodiment. Note that in alternate embodiments, a conventional coil compression spring can be employed (among other types of spring). The washers 576 seat within an outer cylindrical recess 630 formed within the pocket 562 (of portion 120). The washers 576 nested around the cylindrical shaft 572 portion of the axle screw 570. As shown, the washers 576 are oriented so that they cup against each other in opposing directions, thereby providing three discrete compression spring members as shown. In this embodiment, six washers are employed to create this spring shape. In alternate embodiments, the numbers of washers can be varied, along with their thickness and/or spring constant, to generate a different spring force. The axle screw's head 580 is of slightly larger diameter than the inner diameter of the washers 576, thereby allowing the head 680 to restrain the washers against a narrowed shoulder 640 within the cylindrical recess 630. The threaded end 574 of the axle screw 570 is tightened into a threaded wall 650 in the opposing end 160 of the portion 110. The forward shoulder 582 of the cylindrical shaft section 572 of the axle screw 570 helps to set and maintain the resting gap 660 between the two joint ends 160 and 162. When tightened, the washers 576 are placed into spring compression to maintain the joint. However, there is still sufficient clearance for the washers to compress so that the insert wedges 710 can ride out of the grooves 720. The gap 660 is relatively small, so as to prevent play between the portions. The screw head 580 can include a Phillips or other appropriate drive head shape to allow it to be tightened to the appropriate torque. In an illustrative embodiment, the axle screw 570 is constructed from a hard metal, such as steel, with a low-friction surface finish (nickel plating, for example). The axle screw 570 can have a diameter of approximately 3-5 millimeters.

The pockets 560, 562 are capped by press-fitted plugs 564, 566, respectively. The plugs 564, 566 include outer cap surfaces 568, 569, respectively that conform to the surface contour of the surrounding portion 110, 120. In that manner, an appropriate surface coating or plating can be provided to each cap surface 568, 569 so that it visually blends with the surrounding surface finish. In one embodiment, the plugs 562, 564 are constructed from ABS plastic. Thy can be friction fit and/or secured with an appropriate adhesive into the respective pockets.

In operation, when sufficient rotational torque is applied between the two portions 110 and 120 so as to cause the portion 110 and its insert 510 to rotate with respect to the portion 120 and insert 520, the wedges 710 ride out of the grooves 720, thereby causing the screw to move in the direction of the arrow 680. This movement causes compression of the spring washers 576. The wedges 710 move slidably along the intermediate, non-grooved flat surfaces 760 of the insert 520, until they again encounter the groove arrangement 720. At this time, the portions have rotated 180 degrees from their original position. The washers' spring bias causes the wedges 710 to be driven into the grooves, where they will be retained until more rotational torque is applied at the joint 170.

With further reference to FIG. 5, note that each end 140 and 142 includes a respective keyway 590 and 592 that receives a key structure 594 and 596 in each of the resilient tips 144 and 146, respectively. The tips can be secured by locking members, adhesives, or any other acceptable technique according to various embodiments of this invention. An acceptable material for forming the tips is a thermoplastic elastomer TPE. Other materials are expressly contemplated. The size and shape of the tip is highly variable, and can define a longer extension in alternate embodiments.

Figure 8:
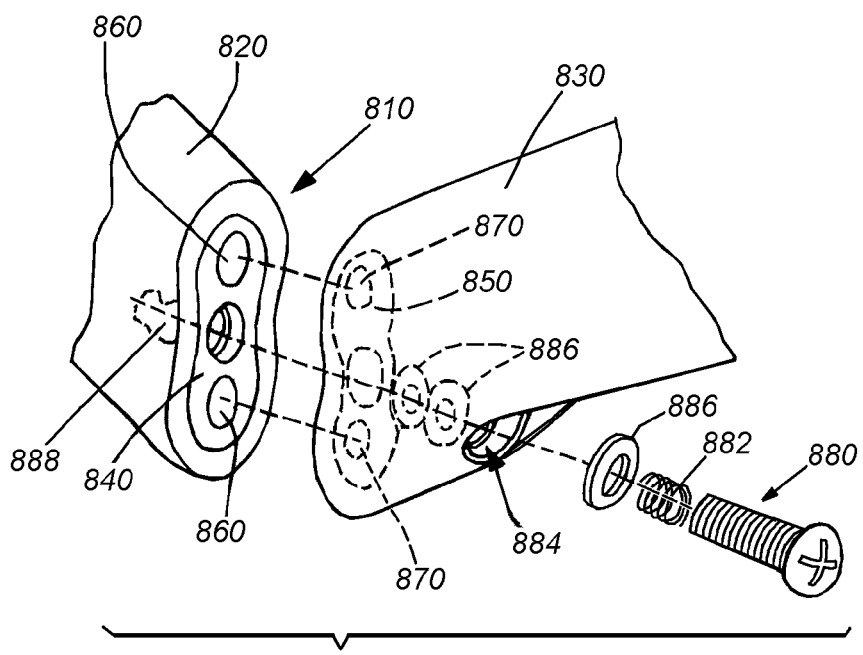
FIG. 8 is a partially exposed, exploded perspective view of a rotary joint including rotary joint inserts according to an alternate embodiment of a clip structure according to this invention.

FIG. 8 shows a rotary joint assembly 810 according to an alternate embodiment of this invention. It can be assumed that the portions 820 and 830 of the structure have a perimeter shape that alternately defines an enclosed orientation and a 180-degree-opposed hook orientation in a manner described generally above. In this embodiment, the cross-section of each portion 820 and 830 defines a somewhat pinched-in (figure-eight) shape. This shape allows each end to receive an insert 840 and 850 within opposing figure-eight shaped recesses. The non-circular nature of the recess prevents rotation of the inserts with respect to their portions once they are seated. The insert 840 includes a pair of detents or holes 860 that are opposed by a pair of raised domes 870 in the opposing insert 850. An axle screw 880 having a threaded end 882 is provided similar to that described above. This screw enters through a cylindrical well 884 that also houses a series of Belleville washers 886, or another acceptable spring assembly. The threaded end 882 is received by a series of threads 888 provided in the end of the portion 820. Note that in an alternate embodiment, the clip of FIG. 1 can be provided with respective insert-receiving recesses and corresponding inserts located on each of the opposing joint ends in the manner of FIG. 8 (rather than a single recess 530 on one end that receives both inserts 510, 520).

Figures 9, 10:
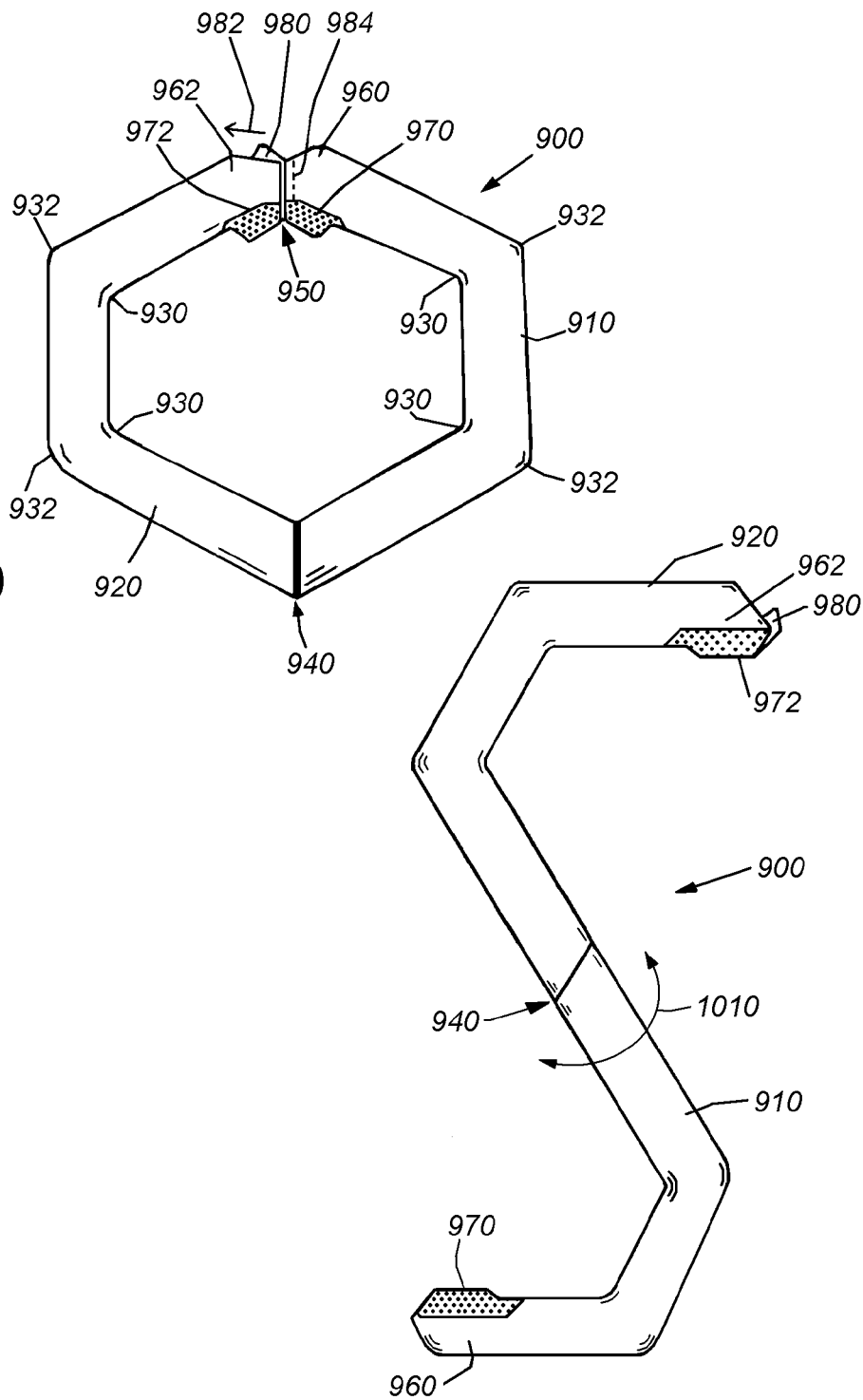
FIG. 9 is a side view of a clip structure defining a hexagonal/polygonal outline according to an alternate embodiment of this invention shown in an enclosed orientation.
FIG. 10 is a side view of the clip structure of FIG. 9 shown in an open orientation to form an S-hook arrangement.
Figure 11:
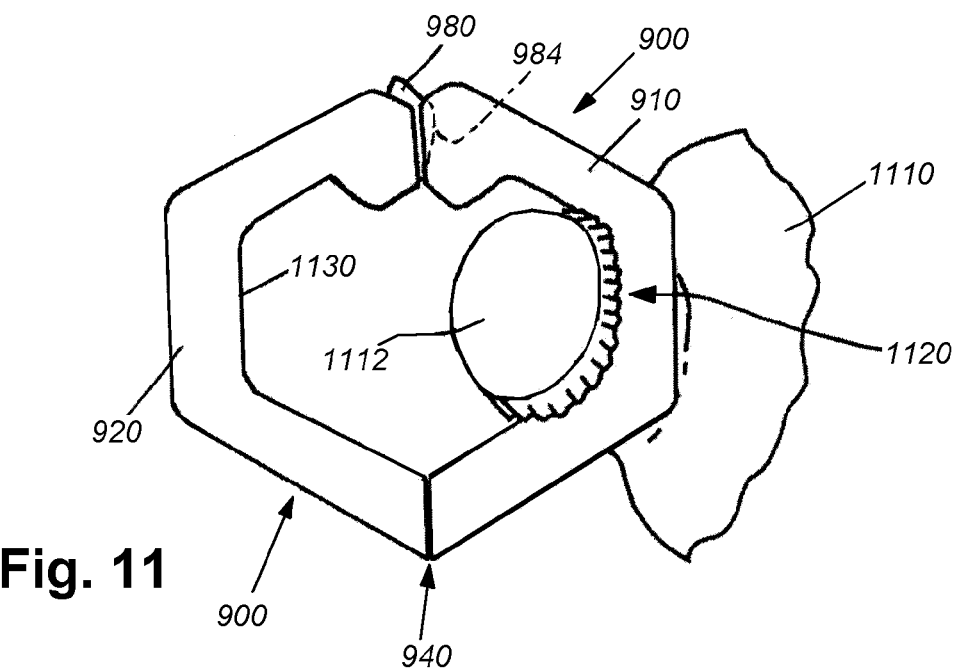
FIG. 11 is a partial perspective view of the clip structure of FIG. 9 showing the use of the inner perimeter as a bottle opener accessory.

Reference is now made to FIGS. 9-11, which show a more "masculine" version of the combined clip and hook structure 900 according to this invention. As shown in FIG. 9, the clip 900 includes a pair of portions 910 and 920 that collectively define an overall hexagon in the depicted enclosed orientation. The inner and outer perimeters are each substantially linear along each segment or side of the polygon, being separated by slightly rounded corners 930 and 932. A bottom rotary joint 940 allows rotation of the portions with respect to each other in a manner generally described above with respect to the embodiments of FIGS. 1-8. An opposing gap 950 is provided at the top free ends 960 and 962 of each portion 910 and 920, respectively. The clip 900 can be constructed from any durable material, such as stainless steel sing casting, machining or another acceptable technique. It should be assumed that the joint 940 is constructed in a manner similar to the spring-loaded indexing rotary joints described above, and are operated in a similar manner, by application of predetermined torque between the portions 910, 920. The top free ends 960 and 962 each carry an interior resilient projection 970 and 972, respectively. These projections, as described above, each act as a frictional member when engaging a table surface and also provide a hook end to prevent the hook (FIG. 10) from sliding off of a supporting member.

Notably, the free end 962 can include an upper extension 980 that acts as a locking mechanism. That is, the extension 980 projects upwardly so that it is accessible by a user's finger or thumb. It can be moved rearwardly (arrow 982) within a conforming slot to take it out of engagement with an opposing slot 984 that is formed within the opposing free end 960. The extension can be a spring-loaded metallic member on a pivot, or can be a resilient extension of the resilient projection 970. The locking mechanism 982 is optional, as the indexing function of the joint 940 allows movement between the enclosed orientation shown in FIG. 9 and the 180-degree opposed orientation shown in FIG. 10. As described above, the opposed orientation in FIG. 10, in which the clip 900 forms an S-shaped hook, is defined by applying torque between the two portions 910 and 920 and rotating (double arrow 1010) the portions with respect to each other until a tactile click is felt when the hook has achieved its final position.

In an alternate embodiment, the free ends can include magnetically attractive structures (not shown) as a locking mechanism. Such a structure can ensure that the free ends require additional torque to unlock the two joined portions. As described herein, the term "locking mechanism" in association with the free ends shall include such mechanical and magnetic arrangements.

With reference to FIG. 11, the illustrative clip 900 includes an inner perimeter shape that allows it to perform a particular task as an added accessory. As shown, a bottle 1110 having a conventional crimp cap 1112 has been inserted into the inner perimeter at the central polygon segment 1120 of the portion 910. The inner surface of the segment 1120 (and potentially the opposing inner surface 1130) is shaped and sized to engage a bottle cap as shown. The inner corners (930) of the leg 1120 are sized to provide appropriate clearance for the particular diameter of a conventional bottle end and cap. Thus, by applying a standard bottle opening motion, the clip 900 is capable of removing the crimp cap 1112. It should be clear that a variety of other tools and/or accessories (described further below), such as a small screwdriver, nail clipper, knife blade, and the like, can be formed or inserted into the various segments of the clip. A clip of this style and type can be worn on a belt loop, placed on a bag or briefcase, attached to a cooler, or otherwise carried with in the enclosed orientation.

Figure 12:
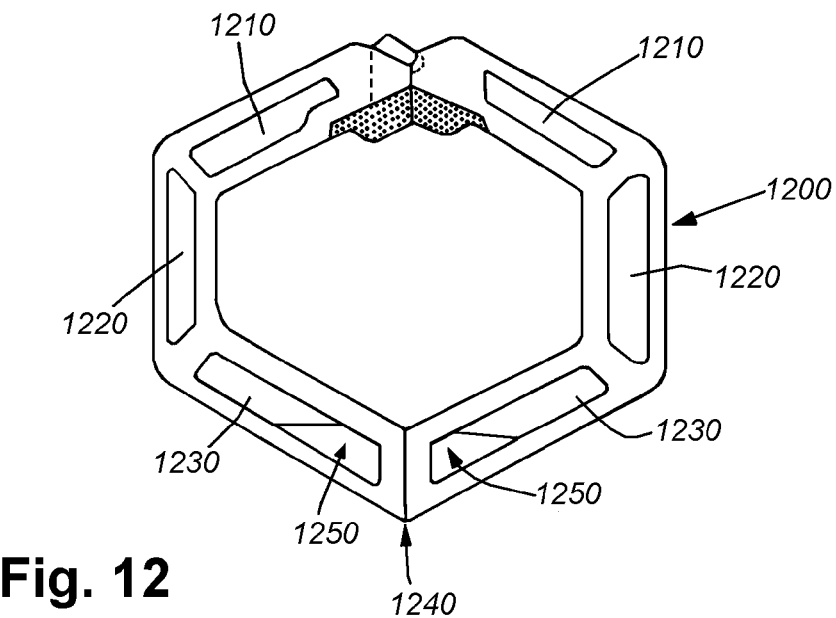
FIG. 12 is a side view of a polygonal clip having a surface detail according to yet another embodiment of this invention, shown in an enclosed orientation.

With further reference to the embodiment of a polygonal clip, as shown in FIG. 12, any of the clips herein can be provided with a decorative surface shape that is appropriate to the style and purpose of that clip. As shown in FIG. 12, a clip 1200 that is functionally and structurally similar to those described above, includes a series of machined through-cuts or deep indentations 1210, 1220, and 1230 within each segment of each portion. The lower section adjacent to the joint 1240 includes in-filled areas 1250 that house the spring and screw-axle mechanism of the rotary joint.

Figure 13:
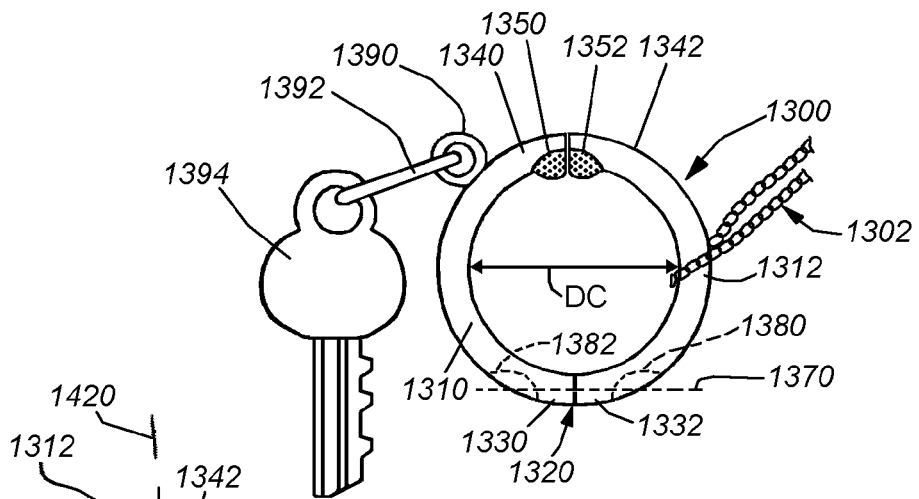
FIG. 13 is a side view of a circular clip according to an alternate embodiment adapted to include an accessory structure in the form of a key or computer memory chain in an enclosed orientation according to a further embodiment of this invention.
Figure 14:
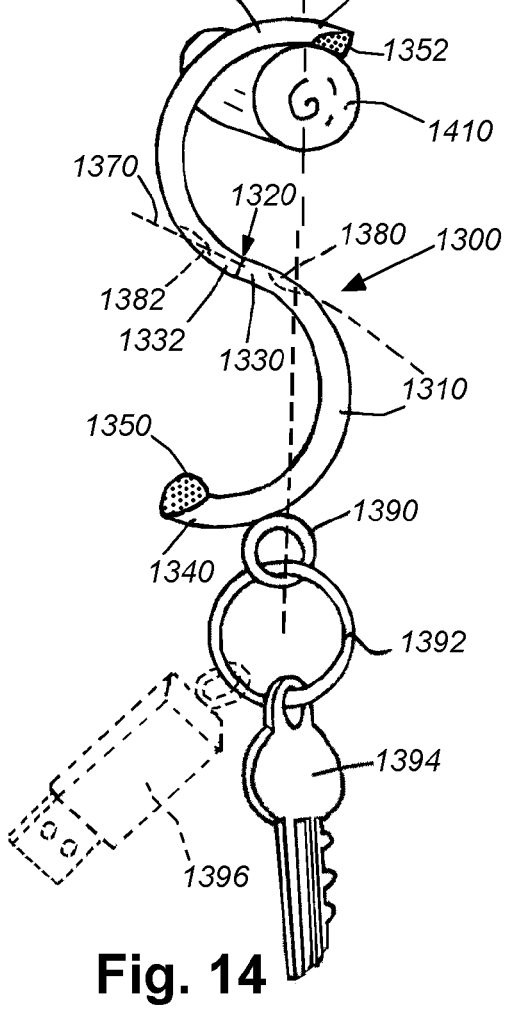
FIG. 14 is a side view of the clip structure of FIG. 13 shown in an open orientation depending from a supporting peg.

It is expressly contemplated that any of the clips described herein can be used in a variety of roles, such as a clothing accessory or piece of functional jewelry. Hence, the size of the clip portions and resulting enclosed area of the inner perimeter of the clip according to various embodiments is highly variable. In particular embodiments, the clip can be sized to be worn on a necklace, or around an item (e.g. a belt loop) that is smaller than a bag or purse strap. Reference is made to FIGS. 13 and 14, which show an accessory clip 1300 formed with a circular perimeter shape (another exemplary shape out of the myriad of possible shapes contemplated herein) with an inner diameter DC that may be 1 inch, more or less. Such a shape and size is suitable to be worn around a neck chain (such as exemplary chain 1302), or on a button hole or belt loop (among other locations).

This embodiment includes a pair of opposed portions 1310, 1312 that again define mirror image halves (semi-circles) with a rotary joint 1320 joining two ends 1330, 1332 thereof and a pair of opposing unjoined ends 1340, 1342 that confront each other with a minimal gap that prevents slippage of the clip in the enclosed orientation (FIG. 13) from passing through a supporting item, such as a jewelry chain. There can be a locking member optionally provided between the two free ends 1340, 1342, such as that shown in FIG. 9. The rotary joint 1320 may or may not include an index assembly. The index can be constructed as a smaller version of that described above in the embodiment of FIGS. 1-8. The joint 1320 allows the opposing portions 1310, 1312 rotates about an axis (dashed line 1370) to rotate between the enclosed orientation of FIG. 13 and an S-hook-shaped orientation as shown in FIG. 14. The axle (and spring assembly where applicable) can be inserted via external cavities that are covered by plugs 1380, 1882 in a manner described above. Other mechanisms can also be used to rotationally attach the two halves (a snap-fit, for example) that do not require one or both external cavities to be formed in the clip structure. The resilient tips 1350, 1352 on each of the respective free ends 1340, 1342 are extended radially inwardly to provide an enhanced hook surface, and thereby provide further stability when the clip 1300 is deployed in hook form to depend from a support surface (peg 1410) as shown in FIG. 14.

Notably this embodiment includes an additional accessory structure. This structure comprises a soldered/welded-on (or otherwise adhered) loop 1390, mounted along the exterior surface/perimeter of the portion 1310. The loop 1390 in this embodiment supports a key ring 1392 with exemplary key 1394. A variety of other items can be attached via the loop 1390, such as the exemplary computer memory stick 1396 (shown in phantom). Thus the term "accessory structure", as used herein should be taken broadly to include a variety of attached structures that enable the interconnection of other items to the clip. The accessory structure/loop 1390 in this embodiment is located on the perimeter of the portion 1340 at a location that causes the attached accessory (key 1394) to depend along a vertical line (dashed line 1420) that is parallel to gravity and rind through the upper arch of the portion 1312 in the depicted S-hook orientation. Thus, the accessory is positioned so as to maintain the balance of the hook when attached to supporting surface (exemplary peg 1410). It should be clear that the loop 1390 (or another accessory structure) can be used to attach one or more other types of accessories. Such possible accessories include, but are not limited to, cellular telephones, personal digital assistants (PDAs), pepper spray canisters, flashlights, pen knives, nail clippers and/or grooming aids, etc.

Note that is also contemplated that the depicted clip 1300 (and/or other clips contemplated and described herein) can be used to carry accessories directly upon one of the portions while the other portion depends from a supporting surface. For example, the user can deploy the hook on a shower stall peg, and place jewelry, watches, etc. on the opposing portion while showering. In a larger size, such as described above, the clip can be carried on a gym bag and used in a locker to hang clothes or to support a towel from a shower curtain rod, etc. while showering. A myriad of possible applications are contemplated.

Figure 15A:
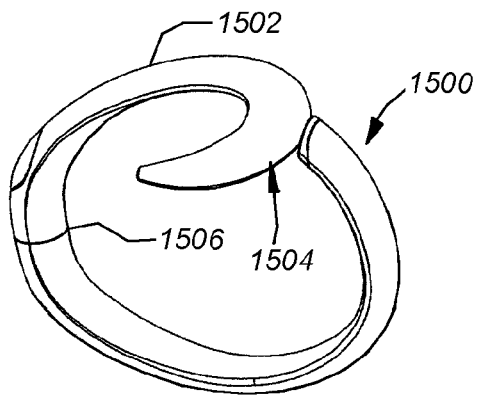
FIGS. 15A-15D are perspective, top, frontal and side views of a bracelet employing the rotary joint according to an alternate embodiment of the invention in an enclosed orientation.

As set forth above, the clip and hook structure can be alternatively integrated into jewelry and other closeable and openable items. In an exemplary embodiment, FIG. 15A is a perspective view of an illustrative bracelet 1500 in an enclosed orientation that can be torsionally converted to an open S-hook configuration. The body of the bracelet 1502 is arranged to enclose a wrist or ankle and features a J-shaped curve 1504 at one of the free ends. The bracelet 1500 features a rotary joint 1506 that is operated by application of sufficient rotary torque. The bracelet 1500 is composed of a metal, such as gold-plated metallic alloy, silver-plated metallic alloy, platinum-plated metallic alloy or any other metal that provides strength and comfort to the wearer. The surface of the bracelet can be decorated with a variety of inscribed or embossed designs and can be jeweled with various combinations and types of jewels. The overall shape of the exemplary bracelet as depicted enclosed orientation in FIG. 15A. The bracelet lies generally within a common plane ("coplanar"), with a J-shaped curve 1504 defined at one free end. The bracelet is coplanar in that the free ends confront each other to form the closure. However, the J-shaped curved end, in fact projects outside the plane to provide an added ornamental effect. It is contemplated that the shape can be asymmetrical, serpentine, twisted, or other shapes.

Figure 15B:
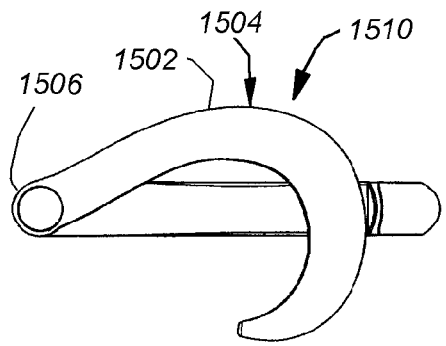

FIG. 15B is a top view 1510 of the exemplary bracelet described in FIG. 15A. This view further shows the profile of the J-shaped curve 1504, which can be viewed as serving both the function of a decorative accent and as the lower hook when in the open S-shaped hook orientation, as described more fully below.

Figure 15C:
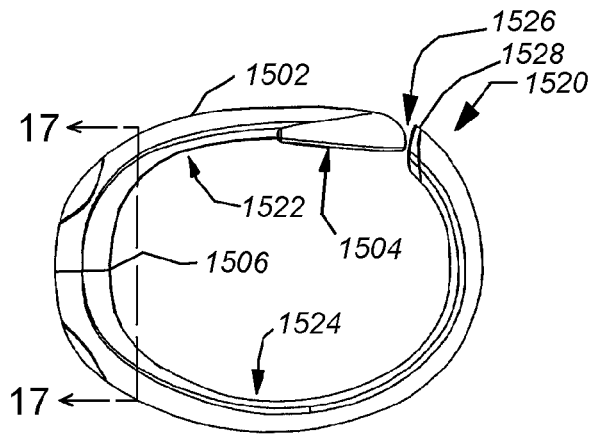

FIG. 15C is a side view 1520 of the exemplary bracelet described in FIG. 5A. There is a lower portion 1522 and upper portion 1524 (upper and lower being defined herein by the open orientation of FIG. 16) that are joined at a rotary joint 1506. There is a gap 1526 between the free end 1528 of the upper portion 1524 and the J-shaped curve 1504 of the lower portion 1522 that functionally permits unimpeded travel by the ends in a full circular motion.

Figure 15D:
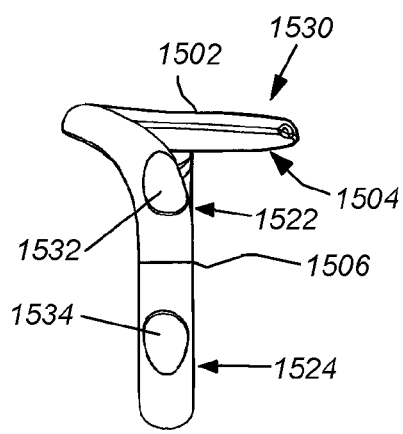

FIG. 15D is an end view 1530 of the exemplary bracelet described in FIG. 15A. The end caps 1532 and 1534 cover the access recesses of the rotary joint assembly (described more fully below).

Figure 16:
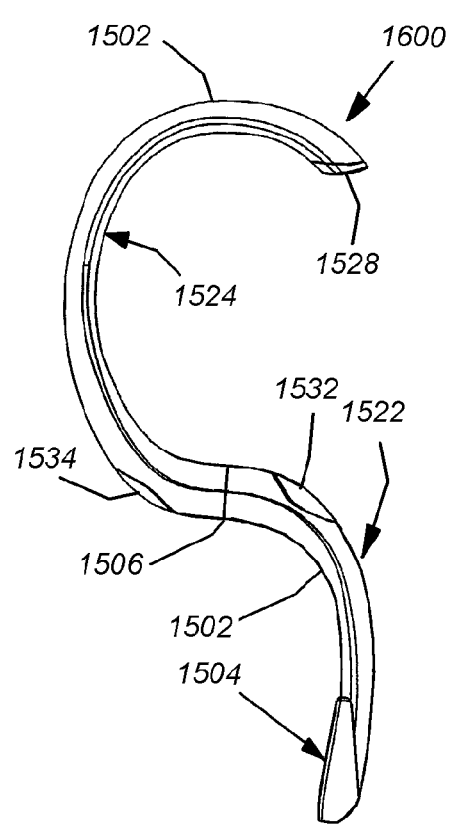
FIG. 16 is a side view of the bracelet of FIGS. 15A-15D shown in an opened orientation.

FIG. 16 is a side view of the exemplary bracelet described in FIG. 15A in the open S-hook orientation 1600. The user has removed the body of the bracelet 1502 from their body and with their hands has applied a counterpoised torsional force to the upper portion 1524 and the lower portion 1522, causing them to rotate around the rotary joint 1506, until the rotary joint mechanism has locked the body of the bracelet 1502 into the open S-hook orientation 1600. The clip and hook are now configured to facilitate the suspension of bags and hand/shoulder-carried items, as set forth above.

Figure 17:
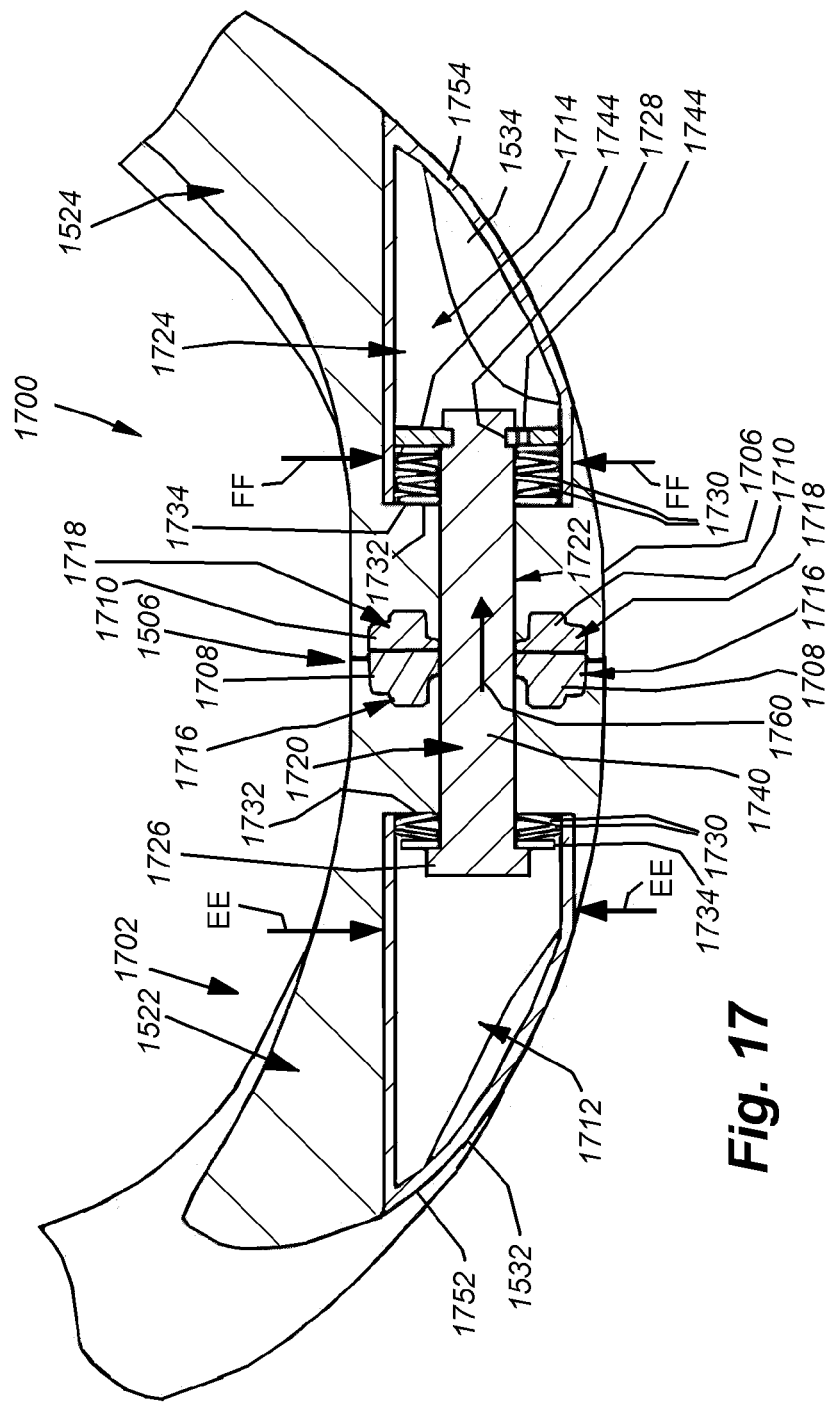
FIG. 17 is a partial side cross section of a bracelet or hook employing a rotary joint according to an alternate embodiment of the invention.

The rotary joint mechanism assembly 1702 is shown in FIG. 17 in cross-section 1700. The functionality of the exemplary bracelet rotary joint mechanism assembly 1702 is similar to the mechanism set forth in FIG. 7. The lower portion 1522 is joined to the upper portion 1524 at the rotary joint 1506. The opposing joint ends 1704 and 1706 of the respective portions 1522 and 1524 are adapted to secure each of a pair of index inserts 1708 and 1710. The inserts 1708 and 1710 are adapted to interengage with each other. The insert 510 includes a pair of radially disposed male wedges (projections) similar to 710 above and the opposing insert 1712 includes a pair of confronting female grooves (detents) similar to 720 above. In this embodiment, the opposing joint ends 1704 and 1706 include cylindrical pockets, respectively 1712 and 1714. The inner diameter EE of pocket 1712 is approximately 8-9 millimeters in this embodiment. The inner diameter FF of pocket 1714 is approximately 8-9 millimeters in this embodiment. The inserts 1708, 1710 are seated within inscribed grooves, respectively 1716 and 1718, within the opposing joint ends 1704, 1706, with little lateral/radial play. The inserts 1708, 1710, in engagement with respective joint ends 1704, 1706, thereby restrict rotation relative to the respective portions 1522 and 1524. Thus, when the portion 1522 is rotated about the rotary joint 1506 by a user with respect to portion 1524, the inserts 1708, 1710 are likewise rotated with respect to each other.

The projections or wedges of the insert 1708, functioning in a manner similar to 710 above, and the conforming detents or grooves of the insert 1710, functioning in a manner similar to 720 above, respectively project outwardly and inwardly approximately 0.3-0.4 millimeters. The overall depth of each insert is between approximately 1 and 3 millimeters. This dimension is highly variable. The inserts 1708, 1710 are constructed from a durable material that can reduce friction and wear generated by the rubbing of the wedges against the surface of the female/groove insert and the female insert's outer surface against the respective joint ends 1704, 1706. The material can be a high performance polymer such as polyoxymethylene (POM). Other materials are expressly contemplated. A variety of geometries for the inserts 1708 and 1710 can be used in alternate embodiments. In alternate embodiments, rather than exhibiting the depicted chiseled shape, the male and female index elements can be rounded over (see FIG. 8, for example).

The exterior walls of each respective free ends 1522, 1524 adjacent to the joint ends 1704 and 1706 define a pair of concentric pockets 1712, 1714, respectively each facing outwardly. The pockets 1712, 1714 provide for through-holes through which the spring and axle assembly of the joint can be inserted. In this embodiment, the joint's axle is a machined axle shaft pin 1720 having an elongate cylindrical barrel section 1722, end 1724 of the same diameter and head end 1726 of larger diameter. A series of cup-like Belleville steel washers 1730 provide the spring assembly in this embodiment. Note that in alternate embodiments, a conventional coil compression spring can be employed (among other types of spring). The washers 1730 seat at the respective inner walls 1732 of the respective inner walls of concentric pockets 1712, 1714. The washers 1730 are held in place by retaining washers 1734. The washers 1730 nested around the cylindrical shaft 1740 portion of the axle shaft pin 1720. As shown, the washers 1730 are oriented so that they cup against each other in opposing directions, thereby providing two discrete compression spring members as shown.

In this embodiment, six washers overall are employed to create this spring shape. The washers are distributed on each side of the shaft pin 1720. This allows for a lower profile while employing a larger number of washers. In addition, the pin can afforded sufficient play in axial movement to enable its end 1724 (without head) to be urged during assembly sufficiently out of the respective concentric pocket to apply a locking washer (for example a circlip 1742 described below). In alternate embodiments, the numbers of washers can be varied, along with their thickness and/or spring constant, to generate a different spring force. The axle shaft pin head end 1726 is of slightly larger diameter than the inner diameter of the washers 1730, thereby allowing the head end 1726 to restrain the washers 1730 against the inner wall 1732 of the joint end 1704 within the pocket 1712. The end 1724 of the axle shaft pin 1720 is inscribed with a rectangular groove 1744 that is fitting with a removable locking washer 1742 Or another axial locking structure) to restrain the Belleville washers against the inner wall 1732 of the joint end 1704 within the pocket 1712. The combined tension of the locking washer 1742 and washers 1730 helps to set and maintain the resting gap 1750 between the two joint ends 1704 and 1706. When assembled, the washers 1730 are placed into spring compression to maintain the joint. However, there is still sufficient clearance for the washers to compress so that the insert wedges of the inserts 1708, 1710 can properly interact (interengage) with detent wells, seating in one position and then transitioning to the opposite seat. The gap 1750 is relatively small, so as to prevent play between the free ends 1522, 1524. In an illustrative embodiment, the axle shaft pin 1720 is constructed from a hard metal, such as steel, with a low-friction surface finish (nickel plating, for example). The axle shaft pin 1720 can have a diameter of approximately 3-5 millimeters.

The pockets 1712, 1714 are capped by press-fitted plugs 1532, 1534, respectively. The plugs 1532, 1534 include outer cap surfaces 1752, 1754, respectively that conform to the surface contour of the surrounding free end 1522, 1524. In that manner, an appropriate surface coating or plating can be provided to each cap surface 1752, 1754 so that it visually blends with the surrounding surface finish. In one embodiment, the plugs 1532, 1534 are constructed from ABS plastic. They can be friction fit and/or secured with an appropriate adhesive into the respective pockets.

In operation, when sufficient rotational torque is applied between the two portions 1522, 1524 so as to cause the portion 1522 and its insert 1708 to rotate with respect to the portion 1524 and insert 1710, the respective wedges (not shown) ride out of the detent wells (not shown), thereby causing the axle shaft pin 1720 to move in the direction of the arrow 1760. This movement causes compression of the spring washers 1730. The respective wedges move slidably along the intermediate, non-grooved flat surfaces of the insert 1710, in a manner similar to FIG. 6 above, until they again encounter the groove arrangement. At this time, the portions have rotated 180 degrees from their original position. The washers' spring bias causes the respective wedges to be driven into the grooves, where they will be retained until more rotational torque is applied at the rotary joint 1506.

Figure 18:
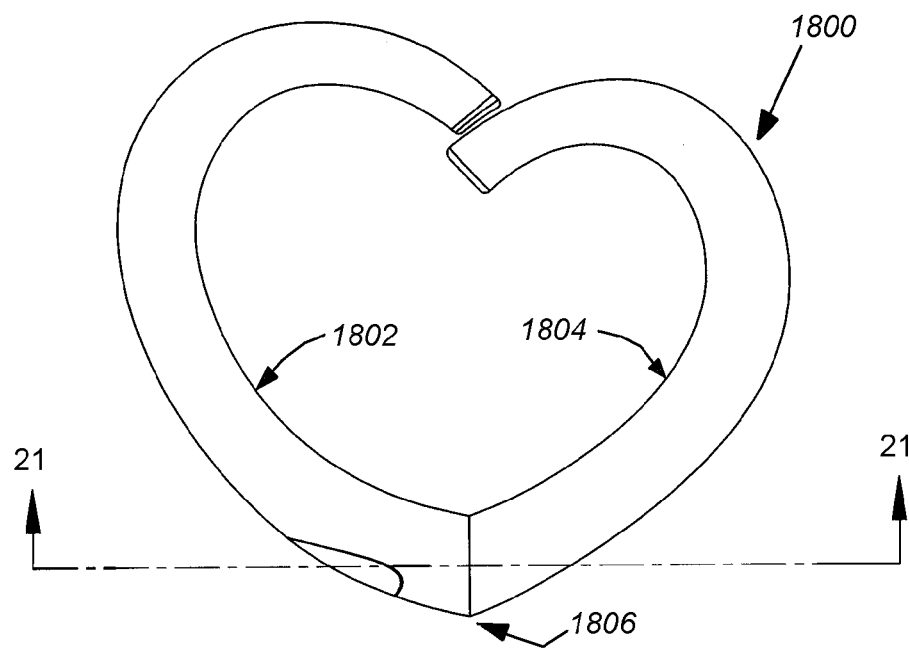
FIG. 18 is a side view of a clip and hook structure constructed from a polymeric material and including a unitary rotary joint according to an alternate embodiment of the invention.

In an alternate embodiment to the clip and hook, FIG. 18 depicts a clip 1800 that is constructed from a plastic material, for example, a high performance polymer. The exemplary clip is heart-shaped, and is composed of an upper portion 1802, a lower portion 1804 and a rotary joint assembly 1806. The exemplary clip 1800 functions rotationally in a manner identical to the clip in FIG. 1 above, but the rotary joint assembly 1806 is a simplified structure, as will be described more fully below. The clip 1800 has fewer parts and requires fewer steps in production, resulting in a lower cost. The clip materials can also be a mixed combination of polymers and metals or other desired materials.

Figure 19:
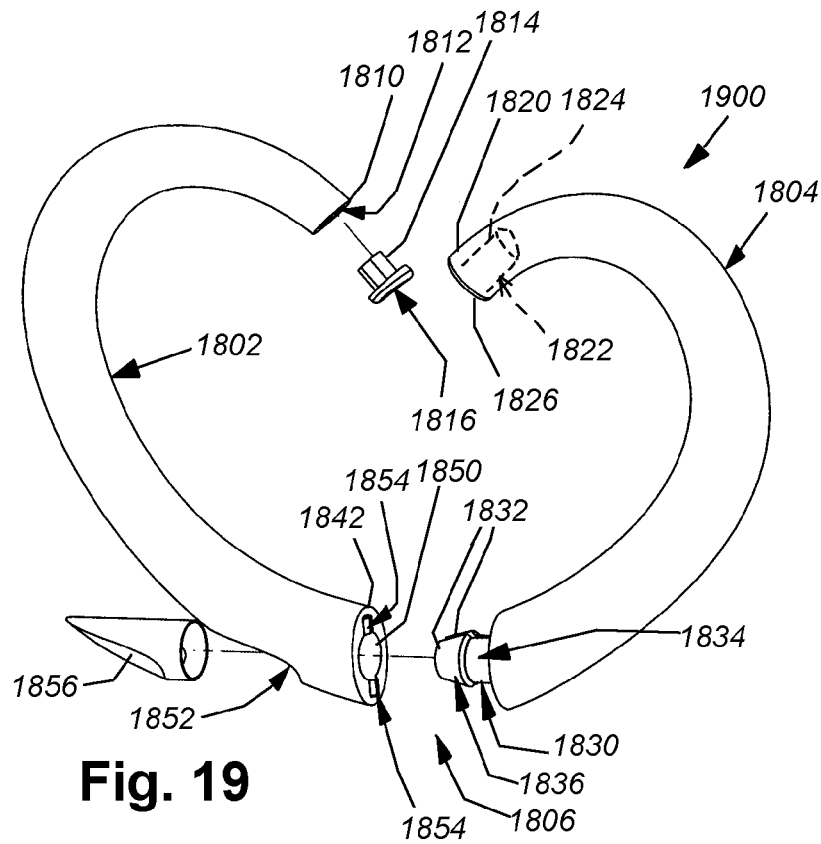
FIG. 19 is an exploded perspective view of the clip and hook structure of FIG. 18 showing components of the unitary rotary joint.

The heart-shaped clip of FIG. 18 is shown in FIG. 19 in an exploded view 1900. The respective free ends 1810, 1820 of portions 1802, 1804 include respective keyways 1812, 1814 that receive a key structure 1814, 1824 in each of the resilient tips 1816, 1826, respectively. An acceptable material for forming the tips is a thermoplastic elastomer TPE. Other materials are expressly contemplated. The size and shape of the tip is highly variable, and can define a longer extension in alternate embodiments. The rotary joint assembly 1806 has an axle shaft assembly 1830 that is formed from the joint end 1840 of portion 1804. In an alternate embodiment, the axle shaft assembly 1830 can be a separate member that is inserted and secured to the joint end 1840 of the portion 1804. The axle shaft assembly 1830 is comprised of two unitary prongs 1832, each of which defines a half cylinder, having a straight neck 1834 and an angular head 1836, commonly formed with the respective portions. The joint end 1842 of portion 1802 has a recess opening 1850 that is a through hole to a recess 1852. The interior features of the recess 1850 will be described more fully below. The joint end 1842 is provided with wedges 1854, which will be more fully described below. The plug insert 1856 is similar to 1534 above in it function and covers the recess 1852.

FIG. 20 is a detail view 2000 of the rotary joint of the heart-shaped clip of FIG. 18. The joint end 1842 of portion 1802 has a flat surface 2002 with two prominent wedges 1854. The wedges 1854 have sloped sides 2012 and a flattened peak 2014. The wedges 1854 are diametrically opposite of each other, so as to provide 180 degrees of arc between the flattened peaks 2014. The center of the joint end 1842 has a recess opening 1850 that is a through-hole, the rear of which is covered by a plug 1856. The portion 1804 has a joint end 1840 that features a flat surface 1920 that includes two wells 1922. The wells 2022 are detents that conform to the wedges 1854 so that the wedges 1854 seat into the wells 2022 and secure the positional orientation of the portion 1802, 1804 of the clip. The center of the joint end 1840 defines an axle shaft assembly 1830 comprised of two prongs 1832, each of which defines a half cylinder, having a cylindrical neck 1834 and a diametrically enlarged conical head 1836 with a flattened end 2030. The prongs 1832 define a wedge-shaped split of predetermined maximum width (in a resting state) with flat inner surfaces 2032. The prongs 1832 have a gap 2034 that is constructed so that the distance DO between the prongs 1832 is greater at the end 2030 than the distance DI of the bottom of the gap 2034.

FIG. 21 is a cross section view 2100 of the rotary joint 1806. The joint end 1844 of portion 1804 is engaged with the joint end 1842 of portion 1802. Not shown are the seated wedges 1854 within the detented wells 2022, locking the orientation position of the clip. The two prongs 1834 are seated within the recess 1852. The gap 2034, as set forth above, is wider at the prong ends 2030. During assembly, when the portion 1804 is driven axially into portion 1802, the prongs 1834 are compressed towards each other, narrowing the gap 2034. After the prongs 1834 have passed through the recess opening 1850, the walls 2104 of the recess opening 1850 hold the prongs 1834 under compression. The prongs 1834 radially bear outwards against the walls 2104, creating a tension fit. Under this tension, the sloped rear walls 2108 of the prongs 1834 pressurably engage the sloped inner walls 2106 of the walls 2104, thereby axially urging the two portions 1802, 1804 towards each other (the slopes converting the radial vector into an axial force vector). This impedes the separation of the portions 1802, 1804 and creates an axial tension at the joint line that holds the rotary joint 1806 in a locked position. When the user applies a counterpoised torsional force, the sloped walls 2012 of the wedges 1854 as shown in FIG. 20 ride up the sloped walls of the detented wells 2022 as the axial tension force is partially overcome, thereby taking the clip out of the current locked position and facilitating movement in the other 180-degree locked position. The prongs 1834 remain under compression and within the recess 1852, maintaining the integrity of the rotary joint 1806 during torsional rotation.

The cross sectional profile of the prongs and associated internal walls can include additional annular formations (not shown) that act to prevent axial pullout of the two components once they are inserted into each other during assembly. That is, the formation can provide shoulders that restrict axial pullout beyond the distance needed for the wedges and detent wells to clear each other during orientation.

Figure 22A:
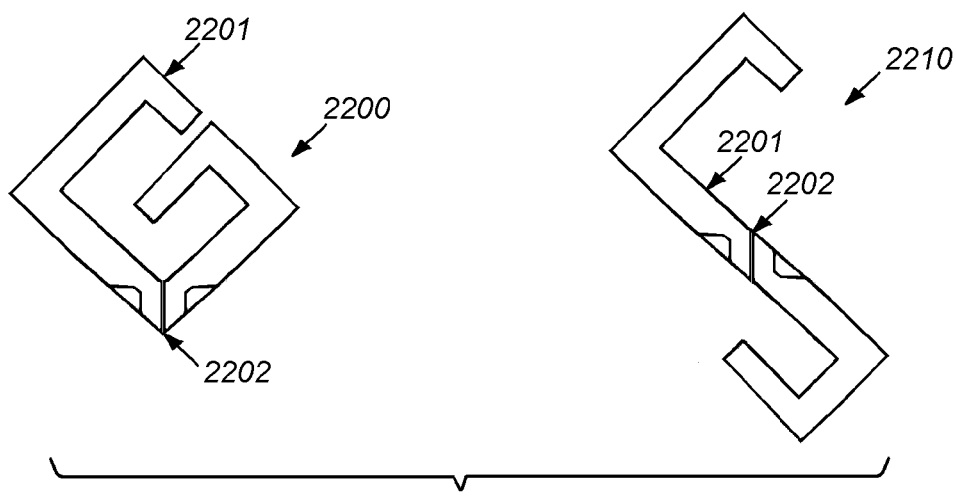
FIGS. 22A-22F are each side views showing an alternate shape and/or closure arrangement for a clip and hook structure in each of enclosed and open orientations.

FIGS. 22A to 22F are alternative shapes for the clip and hook structures. FIG. 22A is an angular G-shaped clip 2201 with a rotary joint 2202 shown in an enclosed orientation 2200 and open orientation 2210 that can be moved torsionally into an angular S-shaped hook in the open orientation 2210 for the suspension of handbags and other articles from a surface.

Figure 22B:
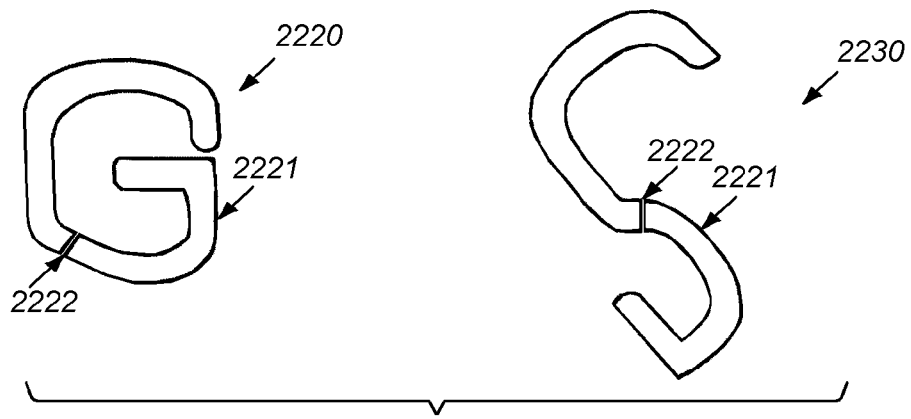

FIG. 22B is a rounded G-shaped clip 2221 with a rotary joint 2222 shown in an enclosed orientation 2220 and open orientation 2230 that can be moved torsionally into an S-shaped hook in the open orientation 2230, likewise for the suspension of handbags and other articles from a surface.

Figure 22C:
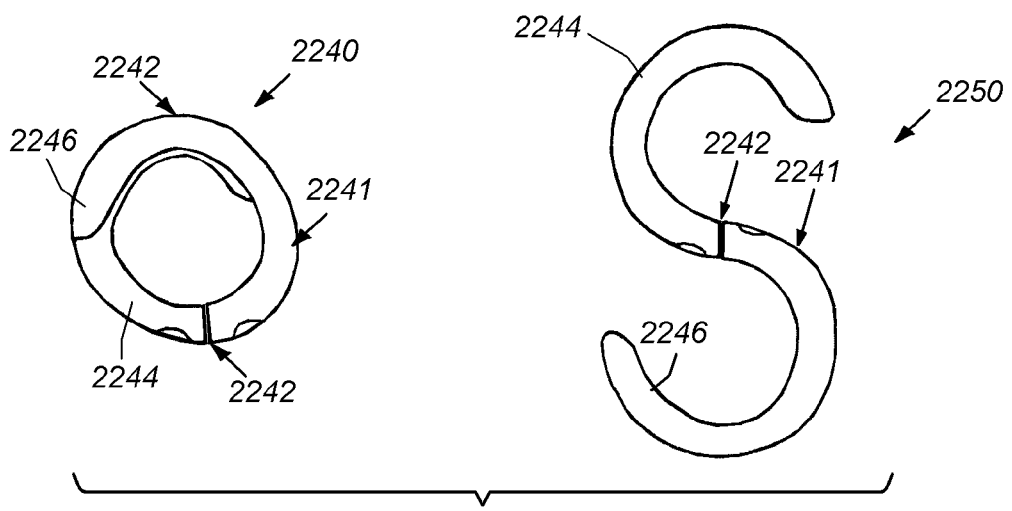

FIG. 22C is an O-shaped clip 2241 with a rotary joint 2242 shown in an enclosed orientation 2240 and open orientation 2250 that can be moved torsionally into an S-shaped hook in the open orientation 2250 for the suspension of handbags and other articles from a surface. The O-shaped clip 2241 defines an overlap 2242 of the portions 2244, 2246 adjacent to their free ends. This overlap 2242 requires that the wedge and detent wells (not shown) of the rotary joint 2242 be rotationally offset, so that the portions reside in non-coplanar orientations in the depicted closed orientation. Alternatively, the portions can be formed with bends that place at least the free ends in non-coplanar positions with respect to each other when the joint is locked in the enclosed orientation. Complete 360-degree rotation of the portions 2244, 2246 is impeded in this embodiment because of the overlap 2242, and typically the enclosed orientation is locked in only one of two possible rotations.

Figure 22D:
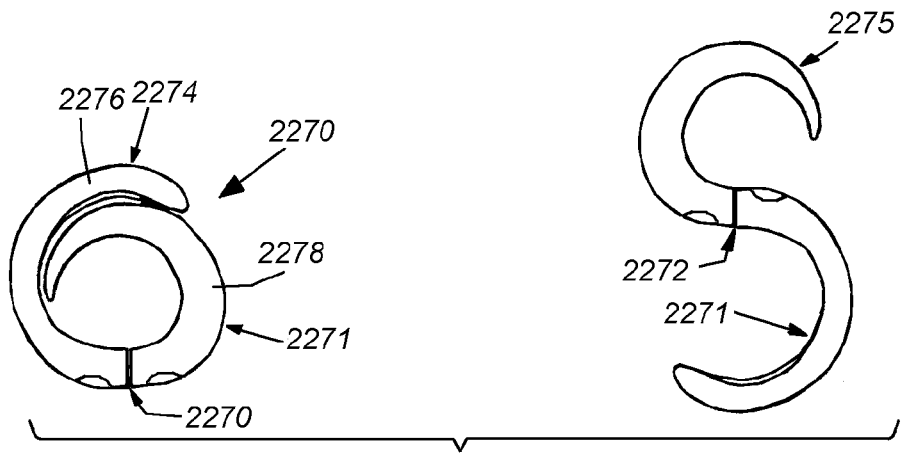

FIG. 22D is a coiled clip 2271 with a rotary joint 2272 in an enclosed orientation 2270 and open orientation 2275 that can be moved torsionally into an S-shaped hook in the open orientation 2275 for the suspension of handbags and other articles from a surface. In its closed orientation, the coil defines an overlap 2274 relative to the coiled clip 2271 of the portions 2276, 2278 and permits complete rotation of the portions 2276, 2278.

Figure 22E:
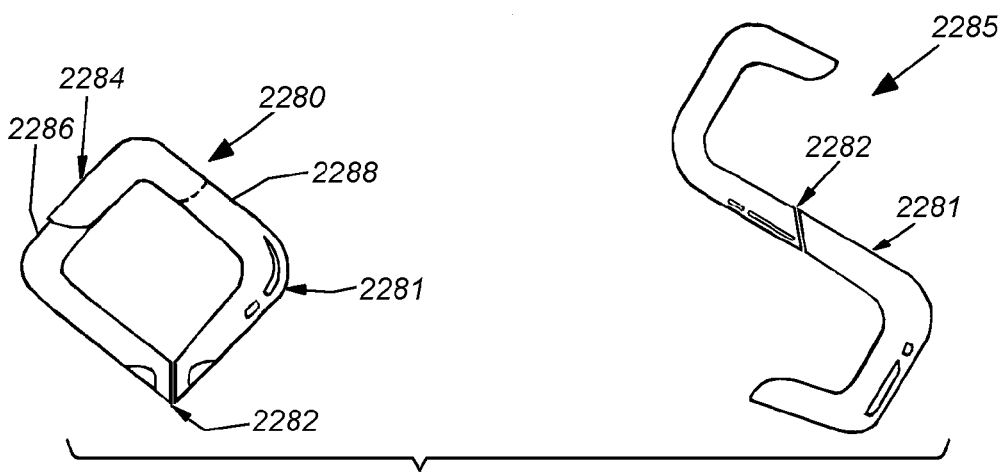

FIG. 22E is an overlapped diamond-shaped clip 2281 with a rotary joint 2282 in an enclosed orientation 2280 and open orientation 2285 that can be moved torsionally into an angular S-shaped hook in the open orientation 2285 for the suspension of handbags and other articles from a surface. The diamond-shaped clip 2281 defines an overlap 2284 of the portions 2286, 2288 adjacent to their free ends. This overlap 2284 requires that the wedge and detent wells (not shown) of the rotary joint 2242 be offset. Complete rotation of the portions 2286, 2288 is not possible because of the overlap 2284.

Figure 22F:
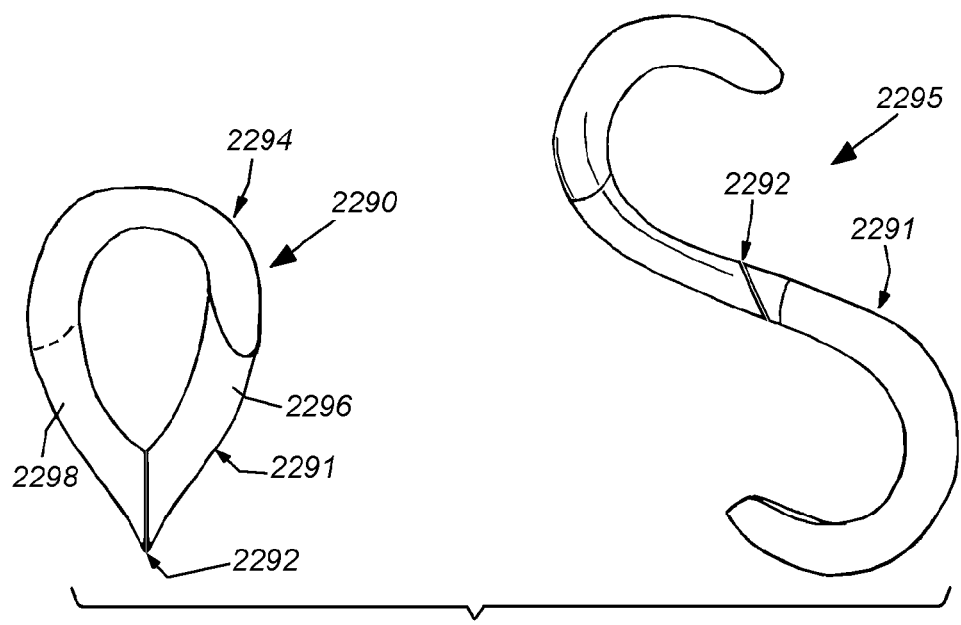

FIG. 22F is an overlapped tear-shaped clip 2290 with a rotary joint 2292 in an enclosed orientation 2290 and open orientation 2295 that can be moved torsionally into an angular hook (for, example an S-shaped hook) in an open orientation 2295 for the suspension of handbags and other articles from a surface. The diamond-shaped clip 2291 defines an overlap 2294 of the portions 2296, 2298 adjacent to their free ends. Complete rotation of the portions 2296, 2298 is not possible because of the overlap 2294.

Figure 23A:
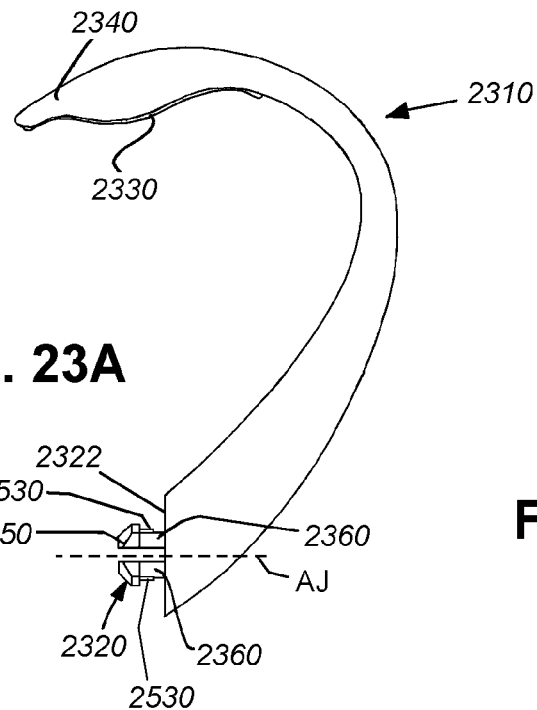
FIGS. 23A-23C are front, side and bottom views, respectively, of a first portion of a clip and hook structure (movable enclosing structure) including a unitary prong assembly for a rotary joint according to an illustrative embodiment.
Figure 23B:
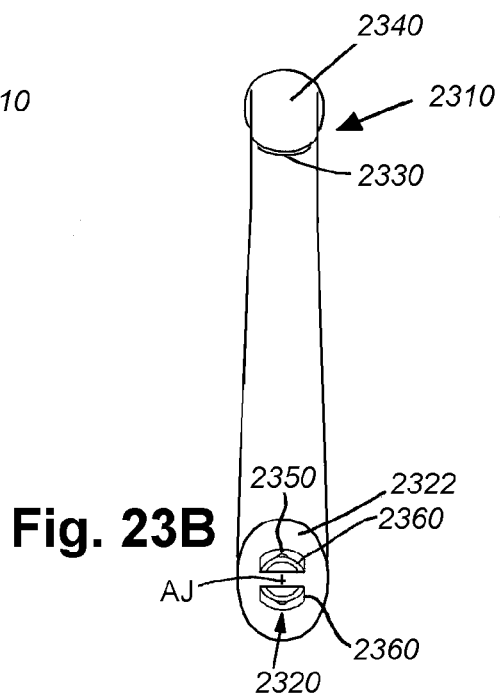
Figure 23C:
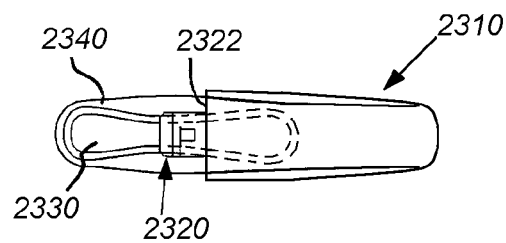
Figure 24A:
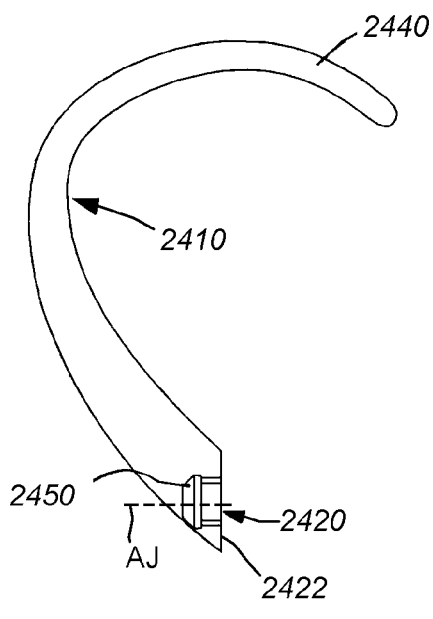
FIGS. 24A-24C are front, side and bottom views, respectively, of a second portion of the clip and hook structure including a recess for receiving the unitary prong assembly of FIGS. 23A-23C in a rotary joint.
Figure 24B:
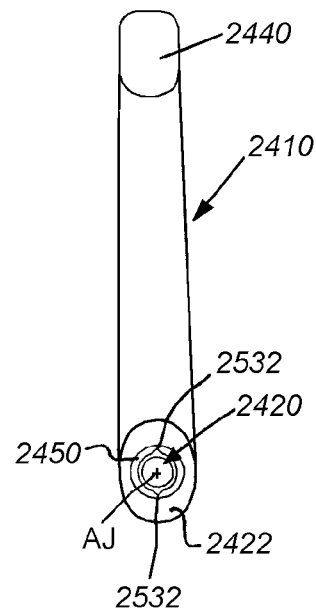
Figure 24C:
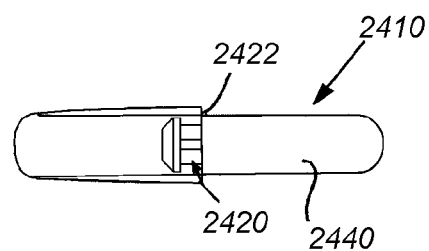
Figure 25A:
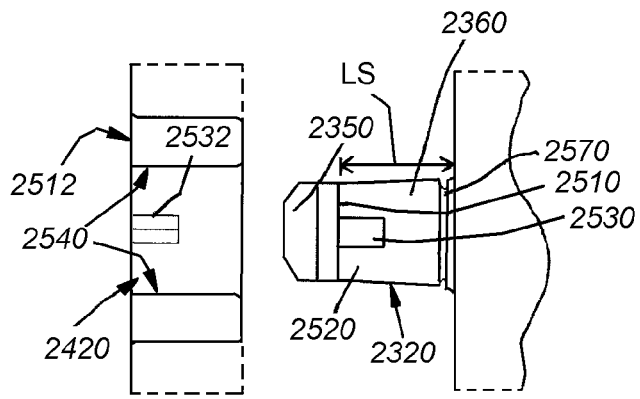
FIGS. 25A and 25B are exposed fragmentary side views of the prong assembly of FIGS. 23A-23C and the recess of FIGS. 24A-24C in each of two orthogonal rotational orientations.
Figure 25B:
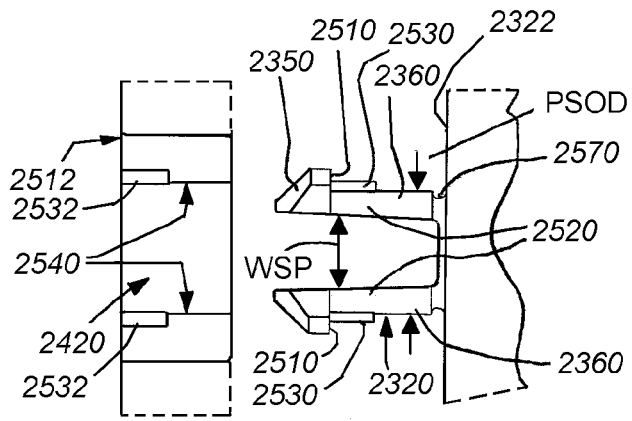
Figure 25C:
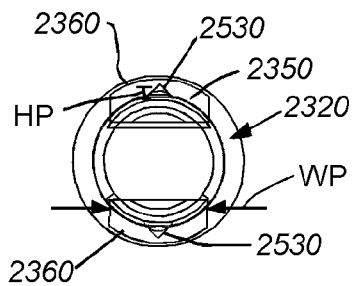
FIG. 25C is a front view of the prong assembly of FIGS. 23A-23C.
Figure 25D:
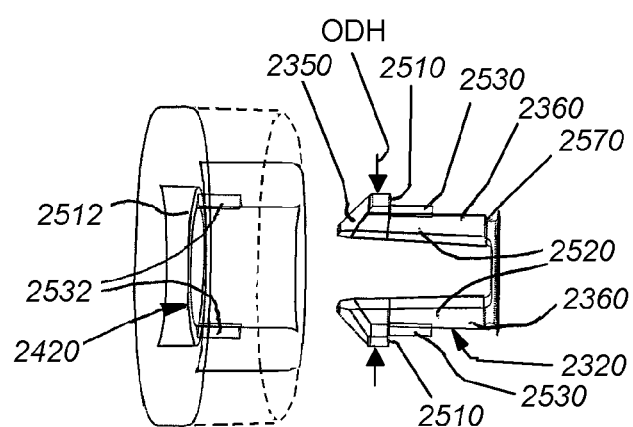
FIG. 25D is an exposed perspective view of the prong assembly of FIGS. 23A-23C and the recess of FIGS. 24A-24C.
Figure 26:
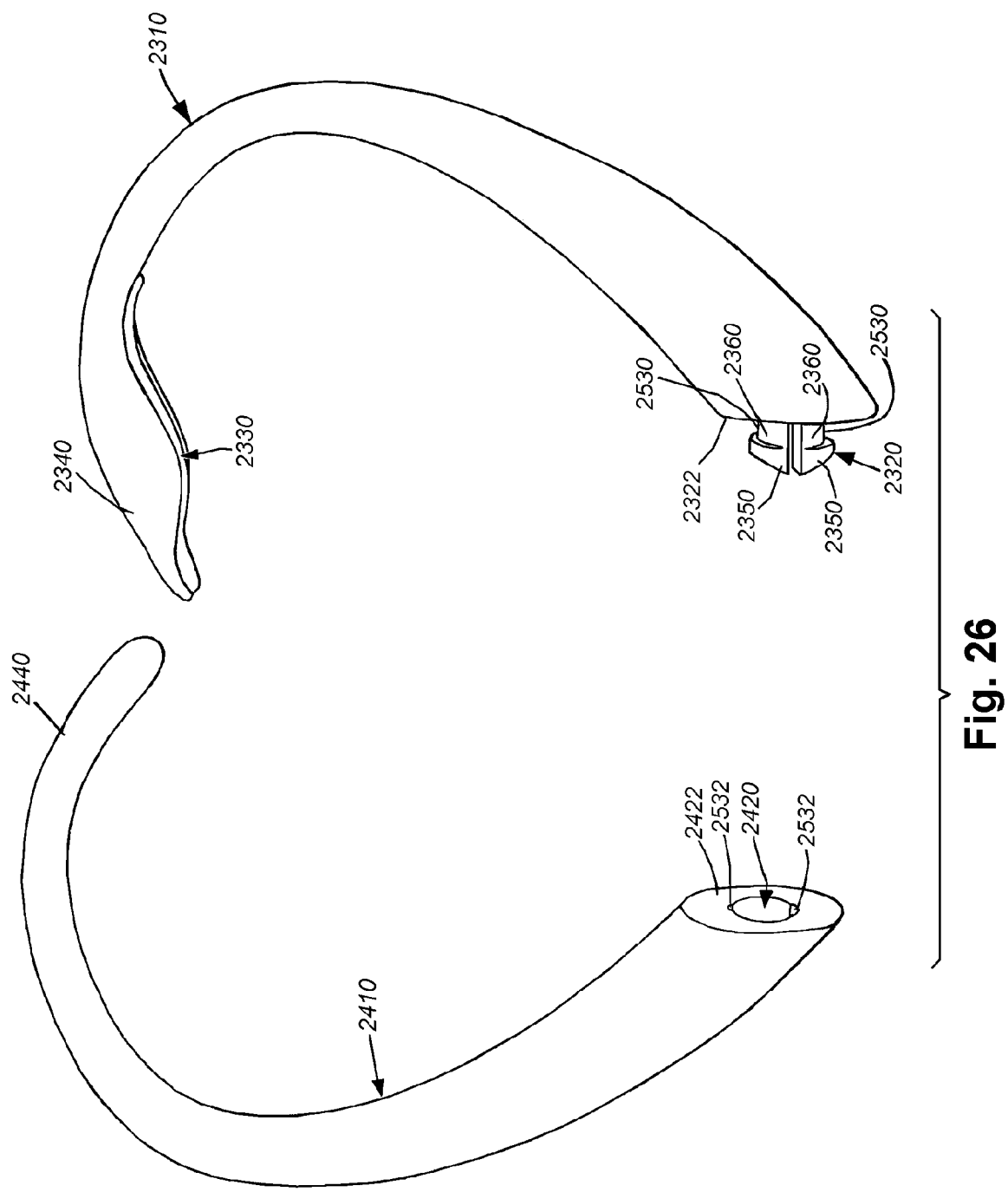
FIG. 26 is an exploded perspective view of the first portion and the second portion of the clip and hook structure of the illustrative embodiment.
Figure 27:
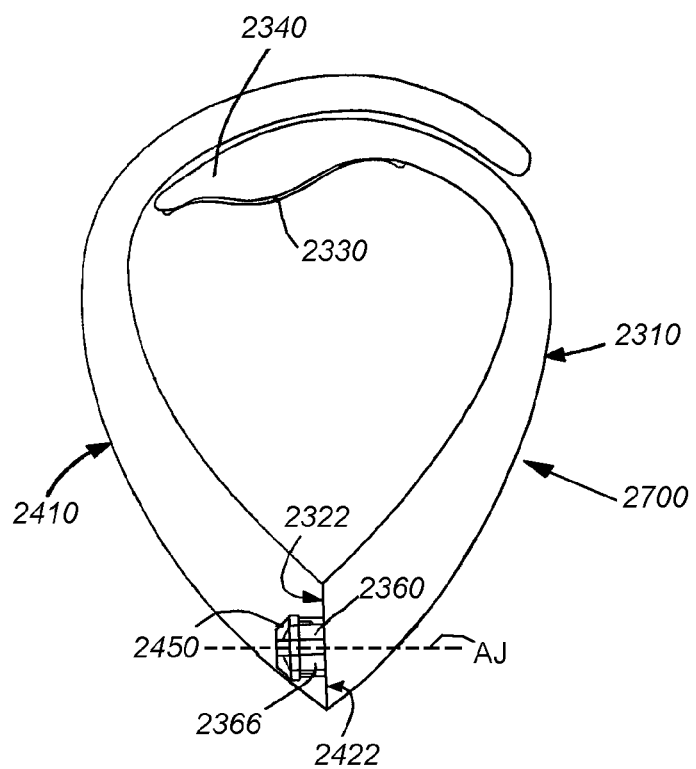
FIG. 27 is an exposed front view of the clip and hook structure of the illustrative embodiment in an closed, loop position, and showing the assembled joint structure.
Figure 28:
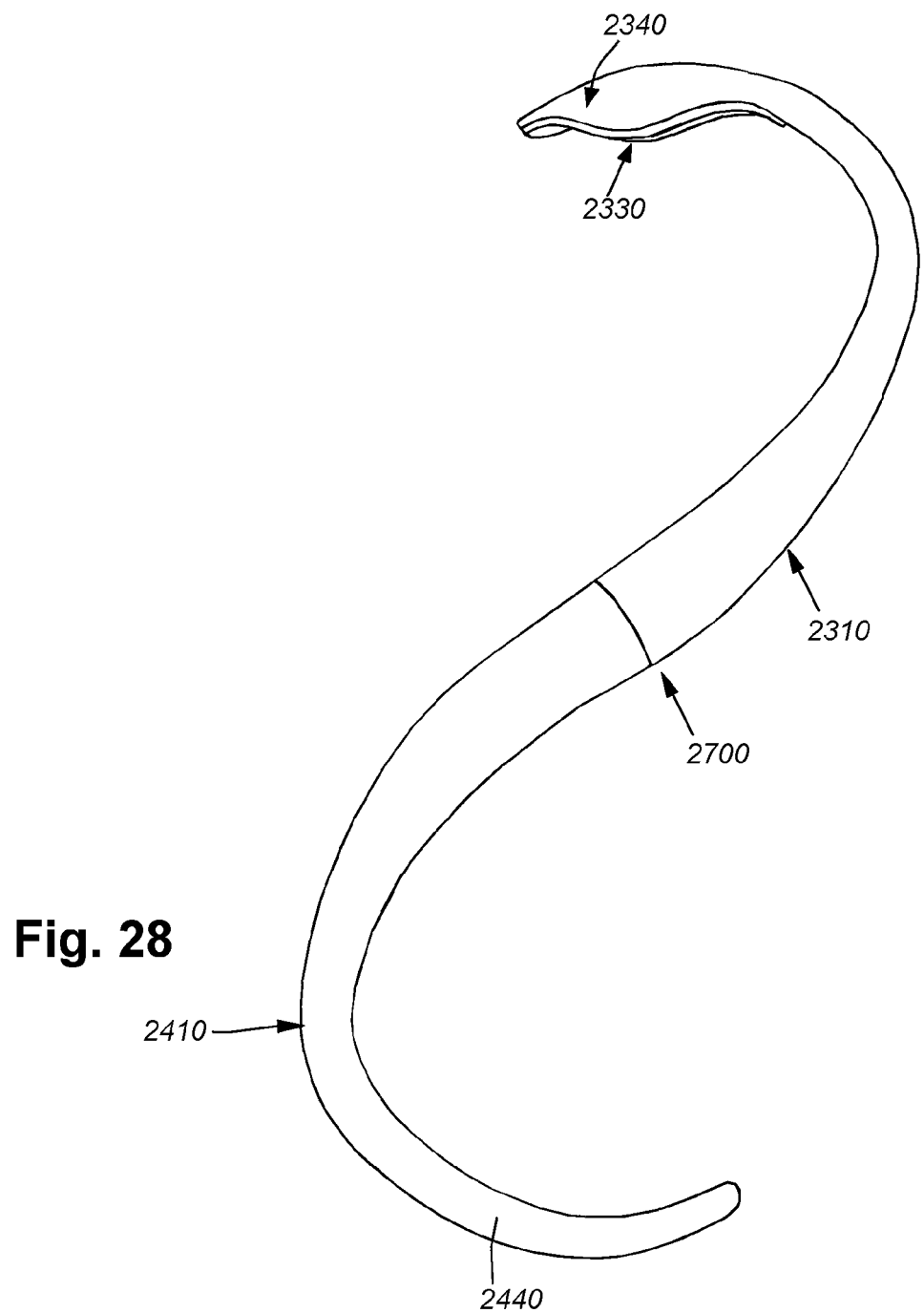
FIG. 28 is a perspective view of the clip and hook structure of the illustrative embodiment in an open, hook position.

A further illustrative embodiment similar to the above-described unitary, prong-carrying clip and hook structure (also termed a movable "enclosing structure") is shown variously in FIGS. 23A-28. With reference to FIGS. 23A-23C a first portion (a partial loop) 2310 of the illustrative rotationally jointed, clip and hook structure 2700 (shown assembled in FIGS. 27 and 28) is shown. FIGS. 24A-24C, likewise show a second portion (also a partial loop) 2410 of the clip and hook structure 2700. As in other embodiments described above, the illustrative clip and hook structure 2700 includes a joint that enables the first portion and the second portion to rotatably move about an axis AJ of the joint between at least two index positions including an open, hook position (See FIG. 27) and a closed, loop position (See FIG. 28). The first portion 2310 illustratively comprises a unitary polymer piece with a prong assembly 2320 at the joint end 2322, and defines a partial loop. A variety of durable polymers with a combination of rigidity, durability and long life can be employed including, but not limited to a Nylon compound, such as Nylon PA66. The second portion 2410 illustratively comprises a metal piece constructed, for example from an appropriate aluminum alloy (for example, 6061) with a joint end 2422 that includes a recess 2420 that is sized and arranged to receive the prong assembly 2320, and also defines a partial loop. The recess 2420 in the second portion 2410 is illustratively formed as part of a separate insert member that is inserted (i.e. snapped) into a conforming socket in the joint end 2422 of the metal part of the second portion 2410. The insert can be constructed from the same or different polymer material than the first portion. In alternate embodiments, the recess can be formed from metal and/or formed directly into the second portion's joint end. Likewise the second portion can also be formed from a polymer or another appropriate material An elastomeric pad (formed from natural or synthetic rubber, or another pliable, friction-generating polymer) 2330 is provided to the free end 2340 of the first portion (the polymer piece) 2310 opposite a joint end 2322 thereof in a location that is constructed and arranged to engage a table of other supporting surface when the structure is rotated to the open position to define a hook (FIG. 28). The pad 2330 can be constructed in a variety of ways and define a variety of sizes and shapes. In this embodiment, it is a thin cover that is adhered to the inner surface of the free end 2340. In alternate embodiments it can comprise a plug-in structure that is secured to one or more recesses in the free end. It can also comprise a co-molded structure with the more rigid polymer first portion 2310.

The prong assembly 2320 and the recess 2420 collectively define closely fitted mating cylinders with conforming frustoconical ends 2350, 2450 that restrict axial movement (i.e. pullout) of the first portion 2310 and the second portion 2410, while allowing axial rotation (about axis AJ) once the prong assembly 2320 is fully seated in the recess (after assembly, as shown in FIG. 27) 2420. In this embodiment, the prong assembly 2310 includes at least two spaced-apart prongs 2360 each having an inclined surface on the frustoconical end 2350 that enables the prongs 2360 to flex inwardly toward each other as they are driven into the cylindrical recess 2420 during assembly. Once assembled, and with further reference to the close-up views of FIGS. 25A-25C the rear face 2510 of each of the prongs 2360 engages an inner circumferential wall 2512 of the recess 2420 and thereby resists axial pullout. The semi-cylindrical shaft 2520 of each of the prongs 2360 also includes an axially aligned, external protrusion 2530 at each located at approximately 180 degrees with respect to the other. These protrusions 2530 movably mate with corresponding indentations 2532 along the cylindrical inner wall 2540 of the recess 2420 at each at a 180-degree circumferential spacing with respect to the other. The protrusions 2530 and indentations 2532 are positioned to allow the joint to index between the open position and the closed position. In an alternate embodiment, the location of the protrusions and indentations can be reversed, with protrusions provided in the recess and indentations provided on the shaft of each prong.

While the dimensions of the overall clip and hook structure 2700 and associated joint assembly are highly variable, in an illustrative embodiment the length of the shaft (LS in FIG. 25A) is approximately 3.55 millimeters, and the corresponding depth of the recess to the wall 2512 is approximately the same. The mean spacing width (WSP in FIG. 25B) between the prongs 2360 is approximately 2 millimeters, and can optionally include a slight, outward taper extending from the joint end 2322. The outer diameter of the prong cylindrical shaft (PSOD in FIG. 25B) is approximately 6.27 millimeters. The inner diameter of the recess in the confronting region of the cylindrical wall 2540 is similar. The approximate width (WP in FIG. 25C) of each prong 2360 is 6.18 millimeters. The maximum outer diameter (ODH in FIG. 25D) of the frustoconical head 2350 is approximately 8.90 millimeters. Its axial length (along axis AJ) is approximately 3.08 millimeters.

The approximate height HP of each protrusion 2530 from the shaft 2520 is 0.86 millimeter. The protrusions 2530 illustratively define a triangular cross section shape as shown, and their respective base (where it meets the shaft) are each approximately 1.73 millimeters across. The conforming indentations 2532 have a similar depth and shape. The axial length of the protrusions is approximately 2 millimeters rearward fro the frustoconical head. The indentations can have a length that fully spans the recess in an embodiment. In alternate embodiments, indentations and protrusions can define a wide variety of differing cross sectional (taken on a plane perpendicular to the axis AJ) shapes and/or sizes. For example a semi-circular or semi-ovular cross section rather than the illustrative triangular shape. Likewise, additional sets of protrusions and/or indentations can be provided to allow for additional index positions (e.g. 90-degree angles).

The prongs 2360 are unitarily attached to the joint end 2322 in the form of a leaf spring/cantilever. To facilitate elastic inward flexure of each prong 2360 both during assembly and in operation (described further below), the base 2570 includes a slight, radiused relief. As suggested in FIG. 26, the first portion 2310 and the second portion 2410 are assembled by plugging the prong assembly 2320 into the recess, at which time the frustoconical end 2350 cams against the recess' inner wall and causes the prongs 2360 to elastically flex inwardly toward each other. Once the frustoconical end 2350 passes into the widened portion of the recess 2410, the prongs 2360 snap back, and secure the two portions against axial pullout.

Once assembled, in operation, rotation of one portion with respect to another along the axis AJ, causes the prongs to flex inwardly slightly as the protrusions 2530 pass rotatably out of the indentations 2532 and ride along the inner wall 2540 of the recess. The shape of the protrusions and indentations (i.e. interengaging formations that break the circular perimeter of the joint) allows a moderate torque to relocate the protrusions out of the indentations. The parameters of the protrusions/indentations' shape and height, in part, govern the amount of torque required to rotatably relocate the two portions, and these parameters can be varied in part based upon trial and error during the design process. Note the maximum outer diameter ODH of the frustoconical end 2350 greater than the maximum outer diameter of the protrusions so that, when the prongs are flexed during relocation, the end 2350 still remains in sufficient engagement with the inner/rear wall 2512 if the recess 2420 to avoid pullout. Notably, the use of axially aligned surface mounted protrusions on the outer wall of the prong shaft and indentations on the inner wall of the recess avoids the need for axial movement during rotation/relocation of the two portions of the clip and hook structure. This arrangement provides a more secure joint with limited (or no) axial movement but a firm open and closed position.

It should be clear that the shape of each portion of the clip and hook structure is highly variable and free ends thereof can be adapted to meet end-to-end as described above. Alternatively, the free ends 2340, 2440 of the respective portions 2310, 2410 can overlie/overlap as shown in the structure 2700. Other geometries in which free ends remain spaced apart are also contemplated. In general, any of the above-described geometries, and others generally contemplated herein, can employ the illustrative joint assembly of this embodiment.

Figure 29:
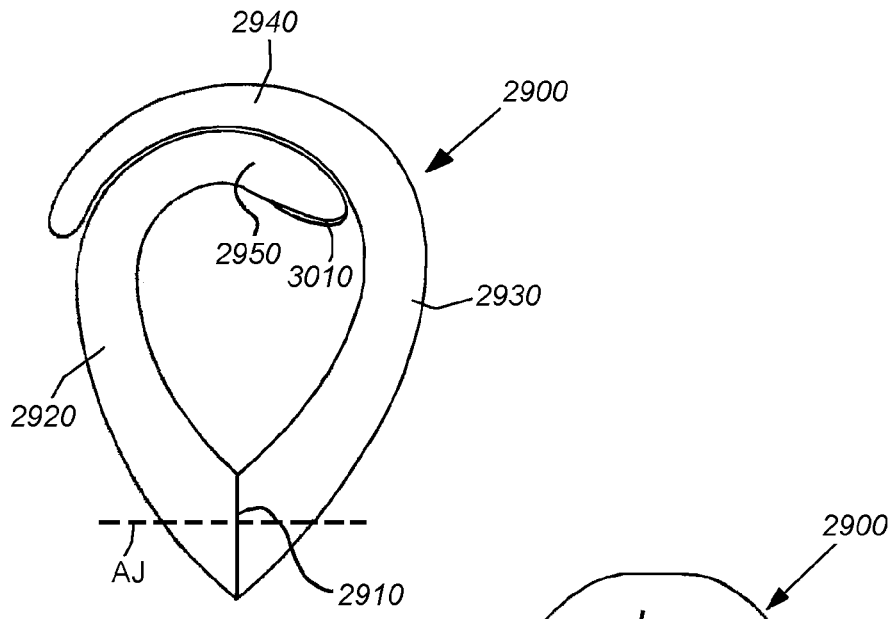
FIG. 29 is front view of a clip and hook structure in a closed position, employing the joint assembly of the illustrative embodiment of FIGS. 23A-28, having a different ornamental shape according to another illustrative embodiment.
Figure 30:
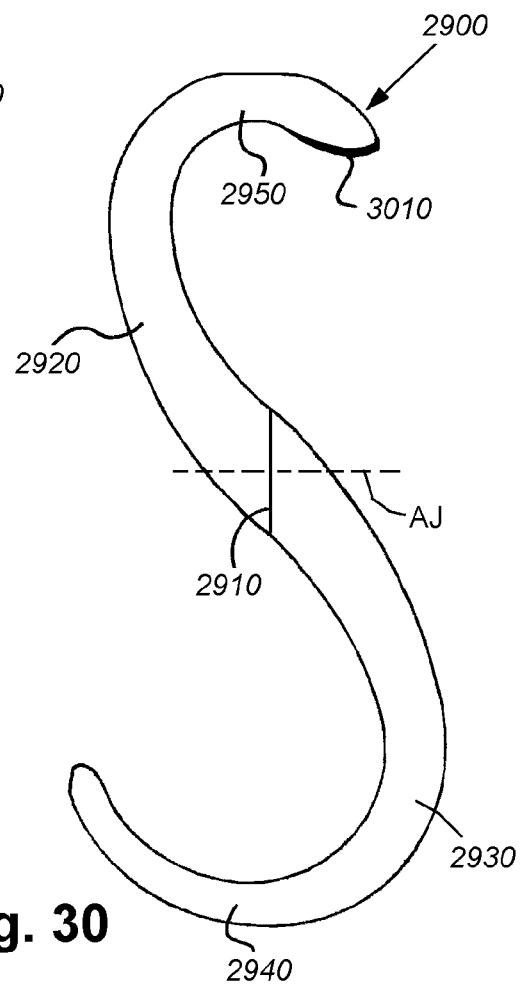
FIG. 30 is a front view of the clip and hook structure according to the embodiment of FIG. 29 in an open position.

With brief reference now to FIGS. 29 and 30, another illustrative embodiment of a clip and hook structure (movable enclosing structure) 2900 is shown respectively in a closed position and an open position. The joint, represented by the fine joint line 2910 between the polymer first portion 2920 and metal second portion 2930 that is essentially indiscernible to the user based upon the snug fit and precision of overall joint assembly (as well as the use of an appropriate surface finish). The joint's internal geometry and construction is similar or identical to that described form the illustrative embodiment of FIGS. 23A-28 above. The first portion 2920 defines a partial loop having an ornamentally sweeping curve. As shown in the closed position of FIG. 29, the second portion 2930 also defines a slightly higher (at the free end 2940) partial loop, in which the free end 2940 overlaps and overlies the free end 2950 of the first portion (i.e. with both free ends lying approximately within the same plane). The first portion's free end 2950 includes an appropriate resilient (e.g. synthetic or natural rubber) pad 3010 at the tip of the free end that is adapted to engage a supporting surface when the structure is in the open position as shown in FIG. 30.

Note that while the open position is referred to as a "hook" it is expressly contemplated that the open position can be adapted primarily as a release mechanism, rather than a support mechanism, as in the case of a bracelet. Also, it should be clear that where dissimilar materials are used for each portion, various finishing and coating processes (e.g. vapor deposition) can be used to provide a unified, pleasing finish to the entire structure. Moreover, it should be clear in alternate embodiments that instead of a molded, unitary first portion, a separate prong assembly can be applied to a socket in a metal or polymer piece that defines the first portion. Additionally, while the recess and prong shafts are generally cylindrical, they can alternatively define conforming frustoconical or other three dimensional shapes. Furthermore, either the prongs or the recess can include only a single interengaging formation that rotates between two remote formations on the opposite member. For example, the prongs can include one protrusion that rotates between diametrically opposed indentation on the recess, or vice versa.

Figure 31:
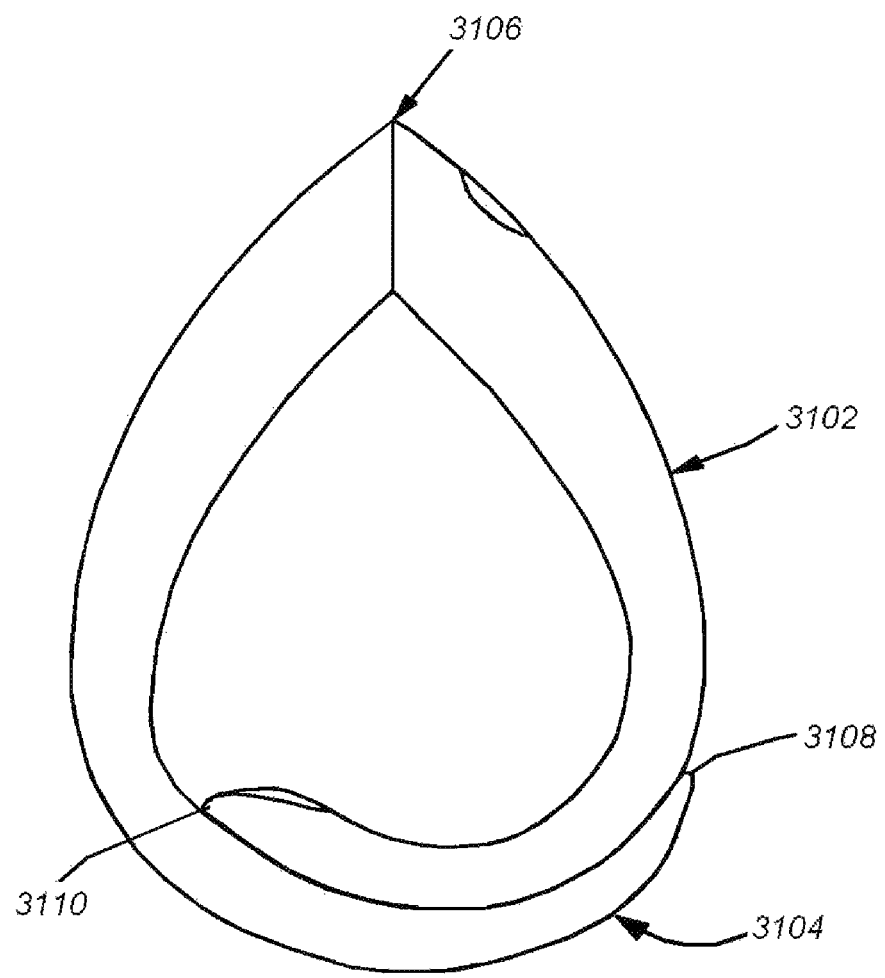
FIG. 31 is front view of a clip and hook structure in a closed position, employing a simplified joint assembly according to another illustrative embodiment.

Reference is now made to FIG. 31, which shows another illustrative embodiment of a rotationally jointed, clip and hook structure clip in a closed position. The embodiment is comprised of a first portion 3102, a second portion 3104 and a rotational joint 3106. The joint's internal geometry and construction is different from that described in FIGS. 23A-30 above. The first portion 3102 defines a partial loop having an ornamentally sweeping curve. The second portion 3104 also defines a slightly higher (at free end 3108) partial loop, in which the free end 3108 overlaps and overlies the free end 3110 of the first portion (i.e., with both free ends lying approximately within the same plane). In the illustrative embodiment, the recess for the axle bolt and the cap are depicted as residing in the first portion and the retaining nut and indicator reside in the second portion. It is expressly contemplated that the retaining nut and indicator can reside in the first portion and the recess for the axle bolt and the cap can reside in the second portion.

In this illustrative embodiment, the materials used for each portion and the joint assembly can be all metal or include plastic and/or non-metal parts for different levels of quality and price.

Figure 32:
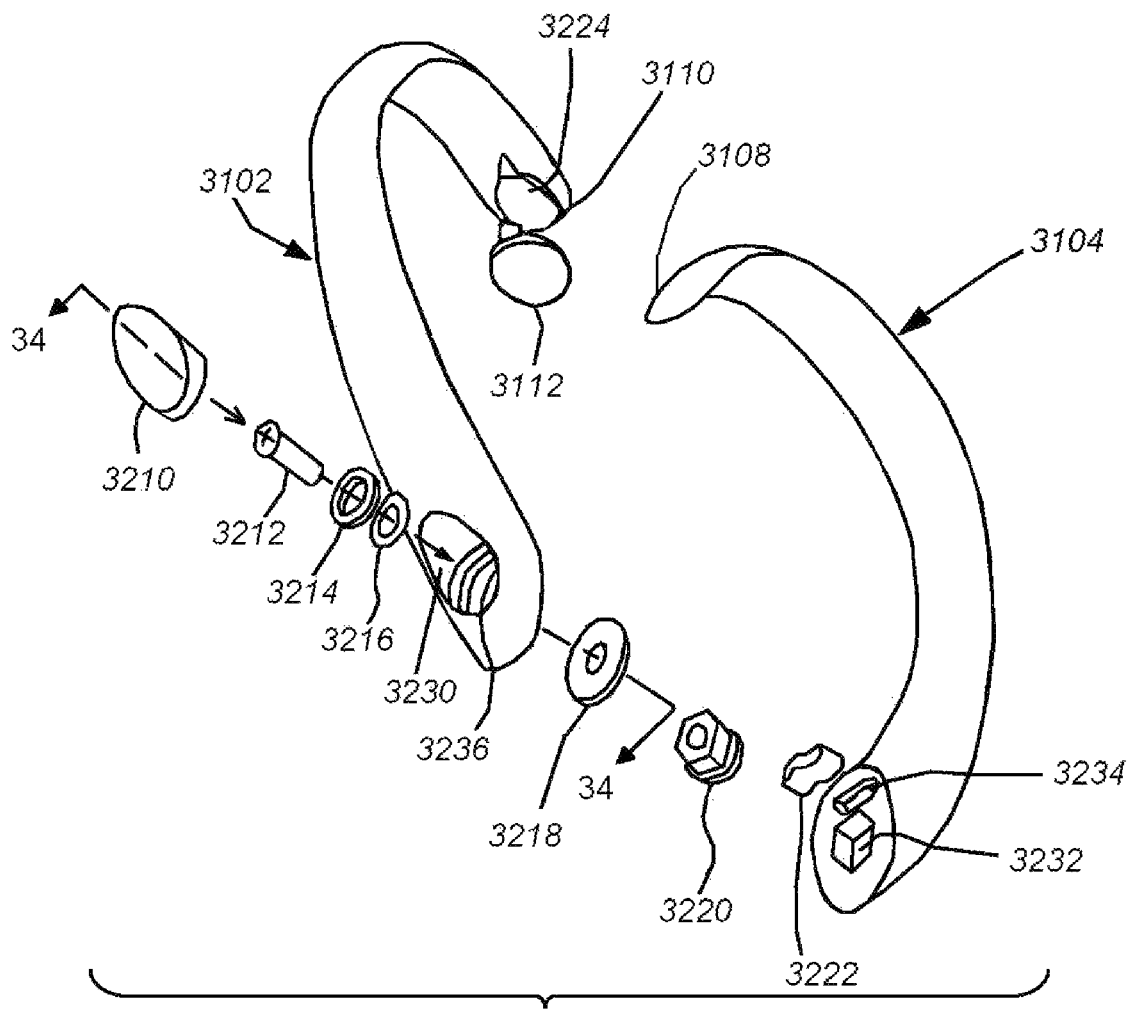
FIG. 32 is an exploded perspective view of the first portion and the second portion of the clip and hook structure of the illustrative embodiment of FIGS. 29-31, according to the illustrative embodiment.

FIG. 32 is an exploded view of the clip and hook structure to show the parts of the joint assembly. The joint assembly is comprised of a cap 3210, an axle bolt 3212, Belleville washers 3214, a unitary washer 3216, an embedded spring support 3218, a retaining nut 3220 and an indicator 3222. The first portion's free end 3110 includes an optional, appropriate resilient (e.g., synthetic or natural rubber) pad 3112 at the inner tip of the free end that is adapted to engage a supporting surface when the structure is in an open position. The resilient insert 3112 and the inset 3224 for the insert are shown on the free end 3110 of the first portion. In other embodiments, the resilient pad can be a textured surface treatment, another frictional surface or omitted. The cap 3210, the axle bolt 3212, Belleville washers 3214, unitary washer 3216 and the embedded spring support 3218 reside within the pocket 3230. The retaining nut 3220 resides within the retaining nut pocket 3232. The indicator 3222 resides within the indicator pocket 3234. During assembly, the axle bolt 3212 passes through the through hole 3236 to engage the retaining nut 3220.

The spring support 3218 is constructed of metal to resist wear and maintain the integrity of the joint assembly. The spring support provides one of two confronting faces with the retaining nut that limit the inner movement of the clip and hook structure. The spring support 3218 and the retaining nut 3220 can be molded into the body of the first portion. The employment of the axle bolt and retaining nut alleviates the need for two caps, and enhances the overall aesthetic appearance of the clip and hook structure. The Belleville 3214 washers function as set forth above, and provide a locking tension for the entire structure that can be overcome by the ramping effect of the two portions rotated out of an indexed orientation. The unitary washer 3216 is an adapter between the Belleville washers 3214 and the embedded spring support 3218.

Figure 33:
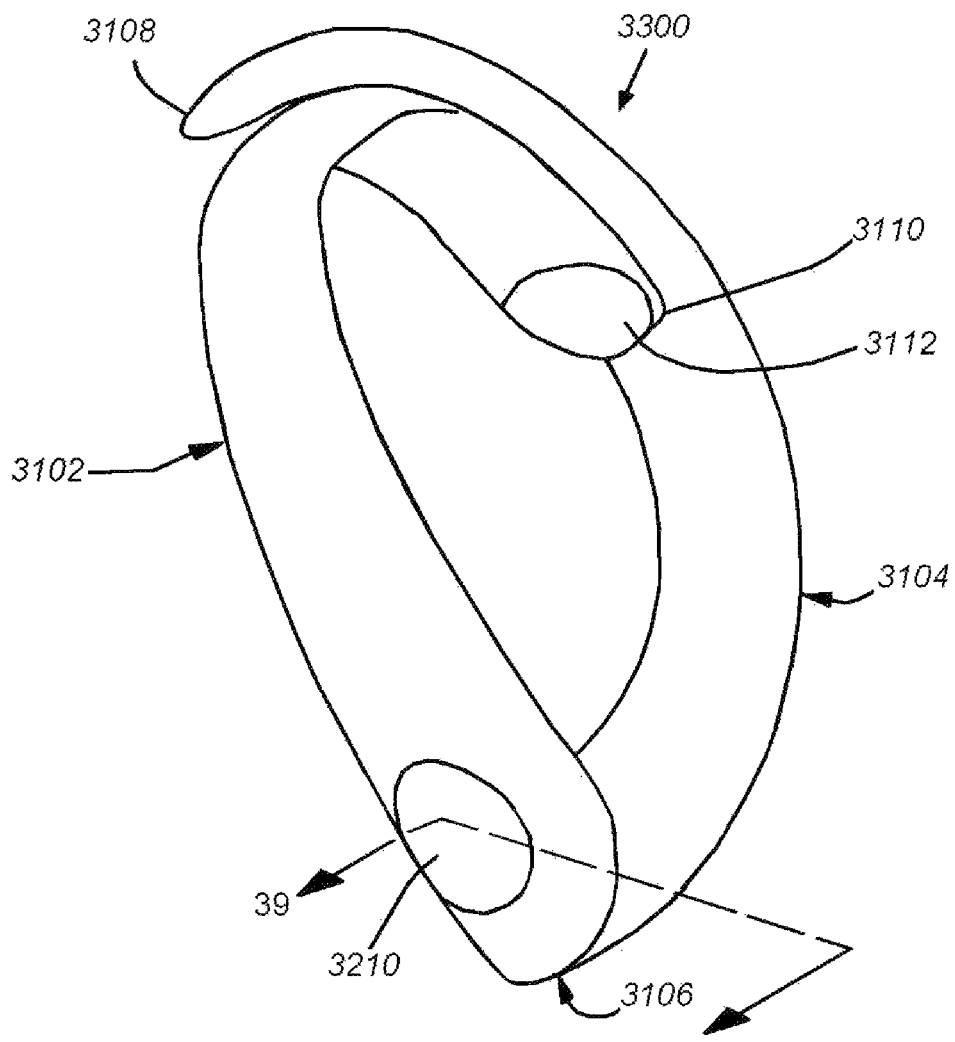
FIG. 33 is a perspective view of the clip and hook structure of the illustrative embodiment in a closed position.

FIG. 33 is a perspective view of the clip and hook structure 3300 and shows the location of the single cap 3210. The cap can be a polymer structure withn appropriate shoulders or other geometry that allow it to snap into the recess that receives it. The cap 3120 can include a finish (e.g. metallized) that matches the surrounding material on the first or second portion.

Figure 34:
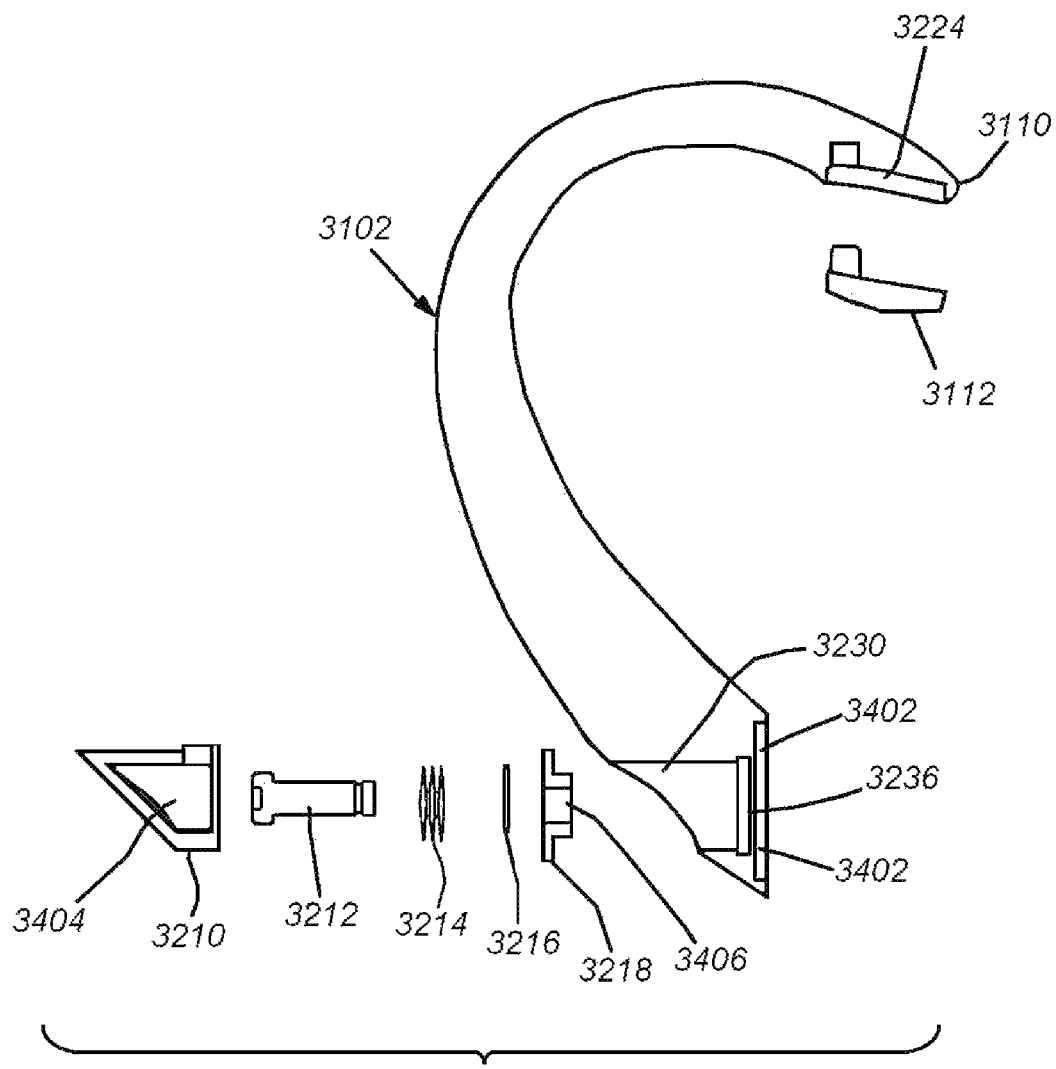
FIG. 34 is an exploded side cross section view of the first portion of the clip and hook structure along lines 34-34 of FIG. 32 according to the illustrative embodiment.

FIG. 34 depicts a cross section of the exploded view of FIG. 32. The cap 3210 has a hollow interior 3404. The spring support 3218 is placed into the pocket 3230 such that it rests against shoulder 3402. The Belleville washers 3214, unitary washer 3216 and spring support 3218 has a through-hole 3406 that aligns with the through-hole 3236. Both through-holes 3236, 3406 are constructed and arranged to provide for the axle bolt 3212 to pass without impingement. The adjacent Belleville washers are oriented in an opposed relationship as shown to enable them to compress against each other and bias the first portion against the second portion. The spring support 3218 is a bearing surface for the rotation of the portion of the clip and hook structure.

Figure 35:
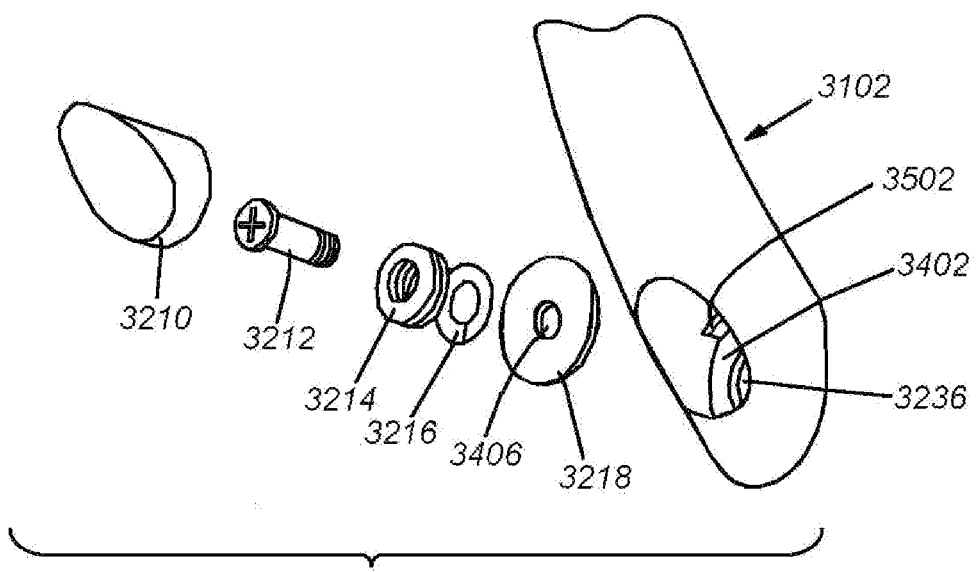
FIG. 35 is an exploded perspective view of the first portion of clip and hook structure according to the illustrative embodiment.

FIG. 35 shows the exploded parts of the joint assembly of the first portion 3102. The shoulder 3402 is visible. Adjacent to the shoulder is a key 3502 that engages a key slot of the cap 3210 (not shown in this view, but set forth more fully below).

Figure 36:
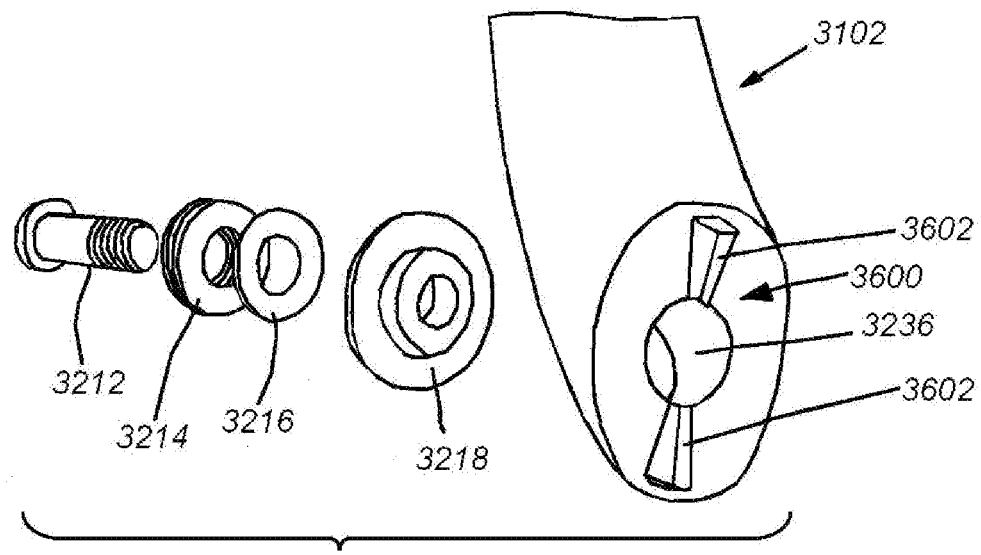
FIG. 36 is a close up exploded perspective view of the first portion of the clip and hook structure according to the illustrative embodiment.
Figure 37:
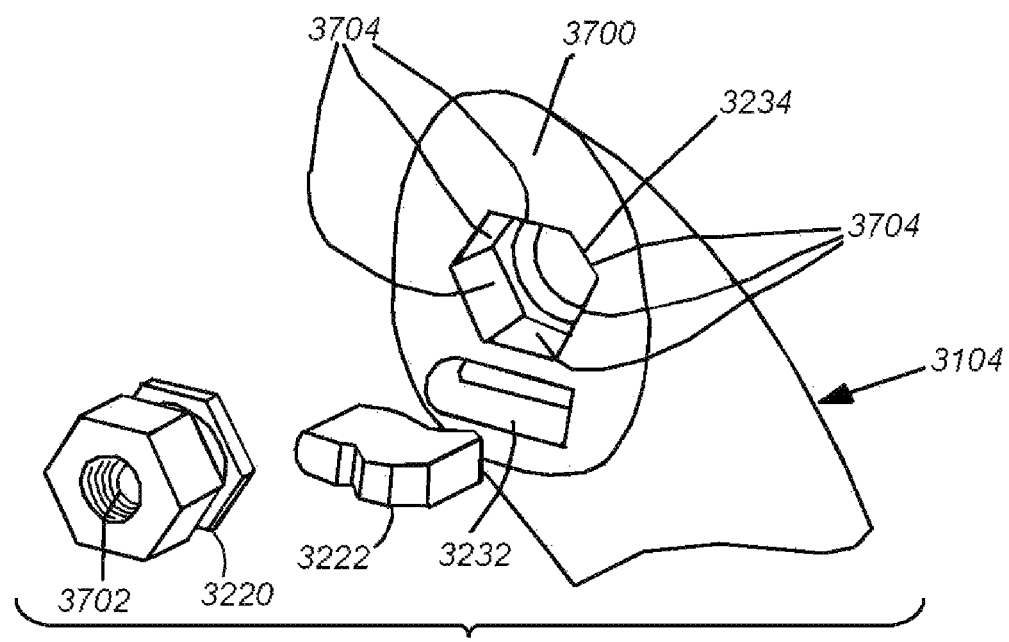
FIG. 37 is a close up exploded view of the second portion of the clip and hook structure according to the illustrative embodiment.

FIG. 36 shows the exploded parts of the joint assembly of the first portion 3102 and the inner surface 3600 of the joint. The inner surface 3600 is provided with two grooves 3602 that are selectively engaged by at least one indicator 3222 (not shown) in each of the first rotational position and the second rotational position. The grooves 3602 function as the grooves set forth above (for example, grooves 2024 in FIG. 20).

The inner surface 3700 of the second portion 3104 is provided with a indicator pocket 3232 and a retaining nut pocket 3234. The retaining nut 3220 is hexagonal-shaped on its exterior and has a threaded hole 3702 that is sized and constructed to receive the corresponding threading of the axle bolt 3212. The inner walls 3704 of the retaining nut pocket 3234 are hexagonal and sized and constructed to hold the retaining nut 3220 and restrains the joint against free rotation. A variety of alternate anti-riotation shapes (e.g. polygonal, splined, gnurled, etc.) can be provided in alternate embodiments. When the retaining nut 3220 is inserted into the retaining nut 3234, the joint is secured. The indicator 3222 engages one or the other of the grooves, holding the clip and hook structure in the clip or hook position.

Figure 38:
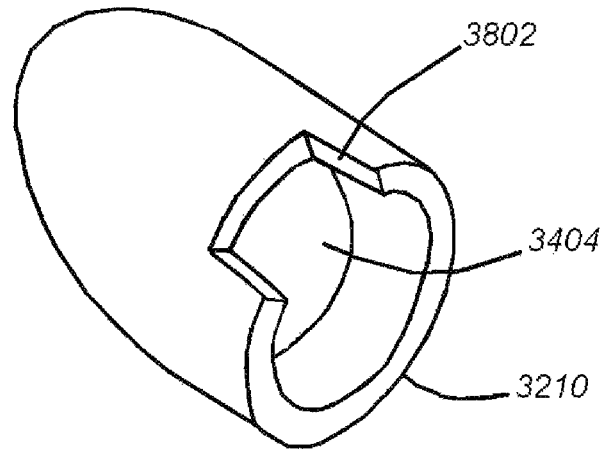
FIG. 38 is a close up perspective view of an end cap of the first portion according to the illustrative embodiment.

FIG. 38 shows the cap 3210 and the slot 3802 that engages the key 3502 in the pocket 3230, as set forth above. This engagement contributes to the security of the joint assembly and helps the cap 3210 to remain in place.

Figure 39:
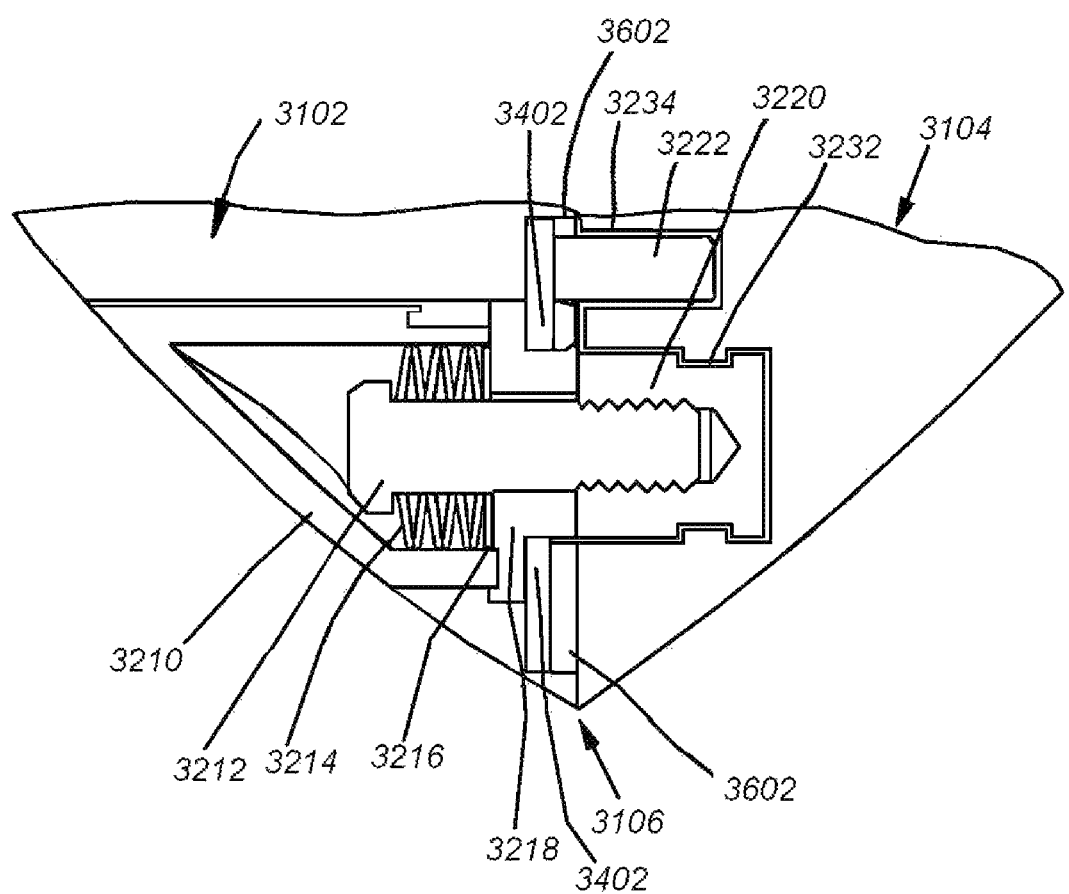
FIG. 39 is a cross section view along lines 39-39 of FIG. 33 according to the illustrative embodiment.

FIG. 39 is a cross section of the joint assembly 3106 in the closed/clip position and shows the position and arrangement of the parts described above. The axle bolt 3212 is threadingly seated into the retaining bolt 3220 and holds together the respective portions 3102, 3104. A variety of polymers with a combination of rigidity, durability and long life can be employed for the internal joint parts and caps, including, but not limited to a Nylon compound, such as Nylon PA66. As noted above, the use of metals for the axle bolt, the retaining nut and the spring support reduce the wear and increases the durability and longevity of the joint. The remaining parts can be composed of metals or durable polymers. In another embodiment, at least one of the first portion and the second portion is comprised of a polymer and the retaining nut can be embedded in a polymer region thereof. At least one of the free ends of the two portions is provided with a resilient pad. The first and second portion are constructed and arranged to define a solid piece of jewelry in the closed position and can be removed in the open position. The clip and loop structure can enclose a strap for a hand-carried bag in the closed position.

While the above-described embodiments include a joint with an index assembly composed of interengaging detent wells and raised wedges, it is expressly contemplated that the interengaging elements of the opposing joint sides can be constructed from an alternate mechanism. In an illustrative embodiment, each half of the joint can be provided with opposing magnets or magnetic material (for example, located at the same positions as the wedges and detents) and embedded in each of the opposing, confronting joint surfaces. The magnets removably lock (or torsionally restrain) the joined parts in each of (at least) two opposing positions, which can be selectively provided by applying sufficient rotational torque to the parts. The term "index assembly" should be taken broadly to include such magnetic and equivalent locking mechanisms. For example, a spring-loaded ball and detent system embedded in each surface of the joint is such an equivalent index mechanism.

It should be clear that the combined hook and clip assembly of the various embodiments of this invention is a highly useful and yet aesthetically pleasing device that can be used by men and women alike. It lends itself to a variety of unique shapes and designs and can be constructed from a variety of materials, or combinations of materials.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the shape defined by the hook or bracelet can include a number of additional curves or angles, both to satisfy certain functions and to provide a unique aesthetic characteristic. Likewise, while a 180-degree indexing mechanism is provided in the rotary joint, it is contemplated that additional detents and/or wedges can be provided to appropriately index the portions to other orientations, in addition to the 180-degree orientation described using pairs of diametrically opposed projections and detents. Moreover, any of the embodiments herein can include opposing wedges and detents, with at least one wedge and at least one detent on each opposing surface of the joint. Likewise, while the rotary joint is constructed using a screw-axle and spring washers in this embodiment, a variety of mechanisms that allow a pair of opposing detent pieces to be biased toward each other can be employed. In addition, while inserts are used for the wedges, domes, detents and grooves in the rotary joint of this invention, in alternate embodiments, such members can be formed directly on the surfaces of the two confronting ends of the portions. The spring mechanism is then applied directly between the portions without intervening inserts. As used herein, the term "inserts" should be taken broadly to include such a directly-confronting surface arrangement each clip portion's joint end. Moreover, while an indexing mechanism based upon confronting projections and detent is shown, a variety of other indexing mechanisms are expressly contemplated, such as a spring-loaded ball, and detent structure located between an outer cylinder on one clip portion and a nested, coaxial inner cylinder on the other clip portion. Also, it is contemplated that the overall structure can include multiple joints that fundamentally define parts that enable an opened and closed orientation (for example, a portion can include a portion that has a plurality or rotational joints). Accordingly, this description is meant to be taken only by way of example, and not to otherwise limit the scope of this invention.

What is claimed is:

1. A movable enclosing structure comprising:
    a first portion and a second portion, each of the first portion and the second portion being rotatably joined at a rotary joint at respective joint ends thereof, the first portion and the second portion each defining a perimeter shape wherein the first portion and the second portion define (a) an enclosed orientation when the joint is in a first rotational position with respective free ends of the first portion and the second portion in a confronting relationship and (b) an open orientation when the joint is in a second rotational position rotationally remote from the first rotational position; and
    the joint including an index assembly that selectively maintains the first portion and the second portion in each of the first rotational position and the second rotational position with movement therebetween by application of predetermined rotational torque at the joint, and
    wherein the joint includes, a pair of opposing grooves on the first portion and at least one indicator on the second portion having a projection for selectively engaging each of the grooves in each of the first rotational position and the second rotational position wherein each of the first rotational position and the second rotational position are approximately 180 degrees rotationally remote from each other.

2. The enclosing structure as set forth in claim 1 wherein the indicator is mounted in an indicator pocket on the second portion.

3. The enclosing structure as set forth in claim 2 wherein the first portion includes each of the grooves formed on a face confronting the indicator.

4. The enclosing structure as set forth in claim 3 wherein the joint includes an axle bolt that passes through each of the first portion and the second portion and is fixedly attached to the first portion or the second portion.

5. The enclosing structure as set forth in claim 4 wherein the axle bolt is threadingly seated into a nut embedded in the first portion or the second portion.

6. The enclosing structure as set forth in claim 5 wherein at least one of the first portion and the second portion comprise a polymer and the nut is embedded in a polymer region thereof and comprises a metal.

7. The enclosing structure as set forth in claim 5 wherein the first portion or the second portion includes a recess that receives the axle bolt and a cap that covers the axle bolt.

8. The enclosing structure as set forth in claim 7 wherein the cap includes an outer surface shape conforming to an adjacent outer surface of the first portion or the second portion.

9. The enclosing structure as set forth in claim 7 wherein recess includes a spring support constructed and arranged to engage and rotate with respect to a face of the nut about the axle bolt.

10. The enclosing structure as set forth in claim 9 wherein the axle bolt includes a spring assembly that biases the first portion against the second portion.

11. The enclosing structure as set forth in claim 10 wherein the spring assembly comprises a plurality of Belleville washers oriented in an opposed relationship.

12. The enclosing structure as set forth in claim 7 wherein the axle bolt includes a spring assembly that biases the first portion against the second portion.

13. The enclosing structure as set forth in claim 12 wherein the spring assembly comprises a plurality of Belleville washers oriented in an opposed relationship.

14. The enclosing as set forth in claim 1 wherein the first portion and the second portion define a loop in the closed position and a hook in the open position.

15. The enclosing structure as set forth in claim 14 wherein the free end of at least one of the first portion and the second portion includes a resilient pad.

16. The enclosing structure as set forth in claim 14 wherein the free end of the second portion overlies and overlaps the free end of the first portion in the closed position.

17. The enclosing structure as set forth in claim 1 wherein the first portion and the second portion define an inner perimeter that, in the closed position, is sized and arranged to fit around a strap of a hand-carried bag.

18. The enclosing structure as set forth in claim 1 wherein the first portion and the second portion are constructed and arranged to define a solid jewelry piece in the closed position and enable removal of the jewelry piece in the open position.

* * * * *